(12) United States Patent
Fukushima et al.

(10) Patent No.: US 7,221,630 B2
(45) Date of Patent: May 22, 2007

(54) INFORMATION RECORDING MEDIUM, INFORMATION RECORDING AND REPRODUCTION METHOD, AND INFORMATION RECORDING AND REPRODUCTION APPARATUS

(75) Inventors: Toshiyuki Fukushima, Osaka (JP); Hiroshi Ueda, Osaka (JP); Motoshi Ito, Osaka (JP); Kenji Takauchi, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 168 days.

(21) Appl. No.: 10/793,637

(22) Filed: Mar. 4, 2004

(65) Prior Publication Data

US 2004/0170098 A1   Sep. 2, 2004

Related U.S. Application Data

(62) Division of application No. 09/802,794, filed on Mar. 9, 2001, now Pat. No. 6,973,016.

(30) Foreign Application Priority Data

Mar. 13, 2000  (JP)  ............................. 2000-068306

(51) Int. Cl.
G11B 7/004 (2006.01)
(52) U.S. Cl. ................................. 369/47.5; 369/47.55
(58) Field of Classification Search ............... None
See application file for complete search history.

(56) References Cited

U.S. PATENT DOCUMENTS

| | | | |
|---|---|---|---|
| 5,548,572 A * | 8/1996 | Kulakowski et al. .... | 369/47.52 |
| 5,598,395 A | 1/1997 | Watanabe | |
| 5,673,249 A * | 9/1997 | Hasegawa et al. ....... | 369/53.29 |
| 5,732,061 A * | 3/1998 | Kirino et al. ............... | 369/116 |
| 5,898,655 A * | 4/1999 | Takahashi ................ | 369/47.53 |
| 6,052,347 A * | 4/2000 | Miyata .................... | 369/47.53 |
| 6,091,688 A * | 7/2000 | Tanoue et al. ........... | 369/47.35 |
| 6,330,392 B1 * | 12/2001 | Nakatani et al. .............. | 386/52 |
| 6,356,515 B1 * | 3/2002 | Kumita et al. ........... | 369/13.26 |
| 6,404,707 B1 | 6/2002 | Kaneda et al. | |
| 6,411,576 B1 | 6/2002 | Furukawa et al. | |
| 6,434,096 B1 | 8/2002 | Akagi et al. | |

FOREIGN PATENT DOCUMENTS

| | | |
|---|---|---|
| JP | 5-282795 | 10/1993 |
| JP | 10-112031 | 4/1998 |

* cited by examiner

Primary Examiner—Andrea Wellington
Assistant Examiner—Michael V. Battaglia
(74) Attorney, Agent, or Firm—Renner, Otto, Boisselle and Sklar, LLP

(57) ABSTRACT

An information recording medium includes a data area for recording data; and a drive information area for recording at least one piece of drive information. The data area is divided into a plurality of segmented areas in a radial direction of the information recording medium. Each at least one piece of drive information includes a recording and reproduction condition corresponding to at least one of the plurality of segmented areas.

18 Claims, 20 Drawing Sheets

(a) Structure of ECC block
(b) Structure of sector

INFORMATION RECORDING MEDIUM, INFORMATION RECORDING AND REPRODUCTION METHOD, AND INFORMATION RECORDING AND REPRODUCTION APPARATUS

This application is a division of U.S. patent application Ser. No. 09/802,794 filed Mar. 9, 2001 now U.S. Pat. No. 6,973,016.

BACKGROUND OF THE INVENTION

1. Field of the Invention

The present invention relates to an information recording medium, and an information recording and reproduction method and an information recording and reproduction apparatus for the information recording medium.

2. Description of the Related Art

As one type of information recording medium having a sector structure, optical discs are known. Since the recording density and capacity of optical discs have recently been improved, it is important to guarantee the reliability of the optical discs. For this purpose, optical disc apparatuses perform adjustment processing for acquiring recording and reproduction conditions to be utilized for recording information to or reproducing information from the optical disc mounted thereon. The recording and reproduction conditions include a recording power condition showing an optimum power of a semiconductor laser for directing light toward an optical disc for recording data. The recording power condition can be acquired by recording power adjustment.

One exemplary method for recording power adjustment is described in Japanese Laid-Open Publication No. 4-141827. Recording power adjustment is performed each time an optical disc apparatus is activated after an optical disc is mounted thereon, or each time the characteristics of the optical disc or the optical disc apparatus are changed by a predetermined level by a factor of a temperature change or the like.

The recording and reproduction conditions including a recording power condition can be acquired in a drive test area in an inner peripheral portion or a drive test area in an outer portion of the optical disc. The optical disc apparatus performs recording and reproduction processing to and from an optical disc mounted thereon using the acquired recording and reproduction conditions.

Due to the recent further improvement in the recording density and capacity of optical discs, there now occurs a case where the recording and reproduction conditions which are acquired in the drive test area in accordance with a conventional method are not appropriate. There is a case where such recording and reproduction conditions are not appropriate to the entire disc, or there is a case where such recording and reproduction conditions are not appropriate when the optical disc apparatus performs recording and reproduction at a different apparatus temperature from the apparatus temperature at which the recording and reproduction conditions were acquired. One conceivable method for adjusting the recording and reproduction conditions is to acquire the recording and reproduction conditions in a drive test area before each recording or reproduction operation is performed. This extends the time period required for adjusting the recording and reproduction conditions, which is impractical.

SUMMARY OF THE INVENTION

According to one aspect of the invention, an information recording medium includes a data area for recording data; and a drive information area for recording at least one piece of drive information. The data area is divided into a plurality of segmented areas in a radial direction of the information recording medium. Each at least one piece of drive information includes a recording and reproduction condition corresponding to at least one of the plurality of segmented areas.

In one embodiment of the invention, the recording and reproduction condition defines an operation condition when an information recording and reproduction apparatus which can have the information recording medium mounted thereon performs data recording and reproduction.

In one embodiment of the invention, each of the plurality of segmented areas includes an adjustment area usable for acquiring the recording and reproduction condition.

In one embodiment of the invention, the data area includes at least one user area and at least one spare area including at least one substitute area usable in place of a defective area in the user area when the user area includes the defective area. An unused substitute area among the at least one substitute area is usable for acquiring the recording and reproduction condition.

In one embodiment of the invention, the data area includes an adjustment-only area only used for acquiring the recording and reproduction condition.

In one embodiment of the invention, the plurality of segmented areas each correspond to at least one zone in accordance with one of a ZCLV format and a ZCAV format.

In one embodiment of the invention, the drive information area includes N ECC blocks for calculating an error correction code, the N ECC blocks each include a plurality of sectors, and the recording and reproduction condition is recorded in one corresponding sector of the plurality of sectors, where N is an integer of 1 or greater.

In one embodiment of the invention, each at least one piece of drive information further includes version information which indicates a condition at which the recording and reproduction condition is acquired.

In one embodiment of the invention, at least one of the plurality of segmented areas includes at least one recording and reproduction instruction area.

According to another aspect of the invention, an information recording medium includes a data area for recording data; and a drive information area for recording at least one piece of drive information. A temperature range indicating a range of ambient temperatures of the information recording medium includes a plurality of segmented temperature ranges. Each at least one piece of drive information includes a recording and reproduction condition corresponding to at least one of the plurality of segmented temperature ranges.

In one embodiment of the invention, the recording and reproduction condition defines an operation condition when an information recording and reproduction apparatus which can have the information recording medium mounted thereon performs data recording and reproduction.

In one embodiment of the invention, the drive information area includes N ECC blocks for calculating an error correction code, the N ECC blocks each include a plurality of sectors, and the recording and reproduction condition is recorded in one corresponding sector of the plurality of sectors, where N is an integer of 1 or greater.

In one embodiment of the invention, each at least one piece of drive information further includes version information which indicates a condition at which the recording and reproduction condition is acquired.

According to still another aspect of the invention, an information recording and reproduction method for an information recording medium including a data area divided into a plurality of segmented areas in a radial direction of the information recording medium includes the steps of (a) indicating a segmented area which is a target of recording and reproduction among the plurality of segmented areas; (b) obtaining a recording and reproduction condition corresponding to the indicated segmented area; and (c) performing recording and reproduction based on the obtained recording and reproduction condition.

In one embodiment of the invention, the recording and reproduction condition defines an operation condition when an information recording and reproduction apparatus which can have the information recording medium mounted thereon performs data recording and reproduction.

In one embodiment of the invention, the step (b) includes the step of acquiring the recording and reproduction condition by adjustment processing.

In one embodiment of the invention, the information recording and reproduction method further includes the step of (d) recording the recording and reproduction condition on the information recording medium.

In one embodiment of the invention, the information recording medium further includes a drive information area having drive information including the recording and reproduction condition recorded therein. The step (b) includes the step of reading the recording and reproduction condition recorded in the drive information area.

In one embodiment of the invention, the drive information includes version information which indicates a condition at which the recording and reproduction condition is acquired. The method further includes the step of (e) determining whether the recording and reproduction condition is re-usable or needs to be updated, based on the version information.

In one embodiment of the invention, the version information includes history information concerning firmware for an information recording and reproduction apparatus.

In one embodiment of the invention, the step (b) includes the step of using an adjustment area included in each of the plurality of segmented areas for the adjustment processing.

In one embodiment of the invention, the data area includes at least one user area and at least one spare area including at least one substitute area usable in place of a defective area in the user area when the user area includes the defective area. The step (b) includes the step of using an unused substitute area among the at least one substitute area in the spare area for the adjustment processing.

In one embodiment of the invention, the step (b) includes the step of using an adjustment-only area included in the data area, which is only used for the adjustment processing.

In one embodiment of the invention, the plurality of segmented areas each correspond to at least one zone in accordance with one of a ZCLV format and a ZCAV format.

In one embodiment of the invention, at least one of the plurality of segmented areas includes at least one recording and reproduction instruction area.

According to still another aspect of the invention, an information recording and reproduction method for an information recording medium, wherein a temperature range indicating a range of apparatus temperatures of an information recording and reproduction apparatus includes a plurality of segmented temperature ranges includes the steps of (a) measuring an apparatus temperature of the information recording and reproduction apparatus; (b) obtaining a recording and reproduction condition corresponding to a segmented temperature range which includes the measured apparatus temperature; and (c) performing recording and reproduction based on the obtained recording and reproduction condition.

In one embodiment of the invention, the recording and reproduction condition defines an operation condition when an information recording and reproduction apparatus which can have the information recording medium mounted thereon performs data recording and reproduction.

In one embodiment of the invention, the step (b) includes the step of acquiring the recording and reproduction condition by adjustment processing.

In one embodiment of the invention, the information recording and reproduction method further includes the step of (d) recording the recording and reproduction condition on the information recording medium.

In one embodiment of the invention, the information recording medium includes a drive information area having drive information including the recording and reproduction condition recorded therein. The step (b) includes the step of reading the recording and reproduction condition recorded in the drive information area.

In one embodiment of the invention, the drive information includes version information which indicates a condition at which the recording and reproduction condition is acquired. The method further includes the step of (e) determining whether the recording and reproduction condition is re-usable or needs to be updated, based on the version information.

In one embodiment of the invention, the version information includes history information concerning firmware for an information recording and reproduction apparatus.

According to still another aspect of the invention, an information recording and reproduction method for an information recording medium including a drive information area for recording drive information including a plurality of recording and reproduction conditions includes the steps of (a) determining whether or not the plurality of recording and reproduction conditions included in the drive information area include a first recording and reproduction condition; (b) when it is determined that the plurality of recording and reproduction conditions do not include the first recording and reproduction condition, determining whether or not the plurality of recording and reproduction conditions included in the drive information area include a second recording and reproduction condition; (c) when it is determined that the plurality of recording and reproduction conditions include the second recording and reproduction condition, calculating the first recording and reproduction condition using the second recording and reproduction condition in a predetermined condition formula; and (d) performing recording and reproduction based on the calculated first recording and reproduction condition.

In one embodiment of the invention, the plurality of recording and reproduction conditions each define an operation condition when an information recording and reproduction apparatus which can have the information recording medium mounted thereon performs data recording and reproduction.

In one embodiment of the invention, the information recording and reproduction method further includes the step of (e) recording the calculated first recording and reproduction condition in the drive information area.

In one embodiment of the invention, the step (d) includes the step of performing a trial of data recording and reproduction with the calculated first recording and reproduction condition. The method further includes the step of (f) determining whether the drive information needs to be updated or the first recording and reproduction condition needs to be acquired by adjustment processing, based on a result of the trial of data recording and reproduction.

In one embodiment of the invention, the information recording medium further includes a data area for recording data. The data area is divided into a plurality of segmented areas in a radial direction of the information recording medium. Each of the plurality of recording and reproduction conditions corresponds to at least one of the plurality of segmented areas.

In one embodiment of the invention, the predetermined condition formula is a function of a radius of the information recording medium.

In one embodiment of the invention, the predetermined condition formula is a function of a linear velocity of the information recording medium.

In one embodiment of the invention, at least one of the plurality of segmented areas includes at least one recording and reproduction instruction area.

In one embodiment of the invention, a temperature range indicating a range of apparatus temperatures of an information recording and reproduction apparatus includes a plurality of segmented temperature ranges. Each of the plurality of recording and reproduction conditions corresponds to at least one of the plurality of segmented temperature ranges.

In one embodiment of the invention, the predetermined condition formula is a function of the apparatus temperature.

In one embodiment of the invention, the plurality of segmented areas are correspond to at least one zone in accordance with one of a ZCLV format and a ZCAV format.

In one embodiment of the invention, the drive information includes version information which indicates a condition at which the recording and reproduction conditions are acquired. The method further includes the step of (g) determining whether the plurality of recording and reproduction conditions are re-usable or need to be updated, based on the version information.

In one embodiment of the invention, the version information includes history information concerning firmware for an information recording and reproduction apparatus.

According to still another aspect of the invention, an information recording and reproduction apparatus for an information recording medium including a data area divided into a plurality of segmented areas in a radial direction of the information recording medium includes an adjustment information processing section for obtaining a recording and reproduction condition corresponding to a segmented area which is a target of recording and reproduction among the plurality of segmented areas; and a recording and reproduction control section for performing recording and reproduction based on the obtained recording and reproduction condition.

In one embodiment of the invention, the recording and reproduction condition defines an operation condition when an information recording and reproduction apparatus performs data recording and reproduction.

In one embodiment of the invention, the adjustment information processing section acquires the recording and reproduction condition by adjustment processing.

In one embodiment of the invention, the adjustment information processing section records the recording and reproduction condition on the information recording medium.

In one embodiment of the invention, the information recording medium further includes a drive information area having drive information including the recording and reproduction condition recorded therein. The adjustment information processing section reads the recording and reproduction condition recorded in the drive information area.

In one embodiment of the invention, the drive information includes version information which indicates a condition at which the recording and reproduction condition is acquired. The adjustment information processing section determines whether the recording and reproduction condition is re-usable or needs to be updated, based on the version information.

In one embodiment of the invention, the version information includes history information concerning firmware for the information recording and reproduction apparatus.

In one embodiment of the invention, the adjustment information processing section acquires the recording and reproduction condition from an adjustment area included in each of the plurality of segmented areas by the adjustment processing.

In one embodiment of the invention, the data area includes at least one user area and at least one spare area including at least one substitute area usable in place of a defective area in the user area when the user area includes the defective area. The adjustment information processing section acquires the recording and reproduction condition from an unused substitute area among the at least one substitute area in the spare area by the adjustment processing.

In one embodiment of the invention, the adjustment information processing section acquires the recording and reproduction condition from an adjustment-only area included in the data area, which is only used for acquiring the recording and reproduction condition.

In one embodiment of the invention, the plurality of segmented areas each correspond to at least one zone in accordance with one of a ZCLV format and a ZCAV format.

In one embodiment of the invention, at least one of the plurality of segmented areas includes at least one recording and reproduction instruction area.

According to still another aspect of the invention, an information recording and reproduction apparatus for an information recording medium, wherein a temperature range indicating a range of apparatus temperatures of the information recording and reproduction apparatus includes a plurality of segmented temperature ranges includes a temperature measuring section for measuring an apparatus temperature of the information recording and reproduction apparatus; an adjustment information processing section for obtaining a recording and reproduction condition corresponding to a segmented temperature range which includes the measured apparatus temperature; and a recording and reproduction control section for performing recording and reproduction based on the obtained recording and reproduction condition.

In one embodiment of the invention, the recording and reproduction condition defines an operation condition when an information recording and reproduction apparatus performs data recording and reproduction.

In one embodiment of the invention, the adjustment information processing section acquires the recording and reproduction condition by adjustment processing.

In one embodiment of the invention, the adjustment information processing section records the recording and reproduction condition on the information recording medium.

In one embodiment of the invention, the information recording medium includes a drive information area having drive information including the recording and reproduction condition recorded therein. The adjustment information processing section reads the recording and reproduction condition recorded in the drive information area.

In one embodiment of the invention, the drive information includes version information which indicates a condition at which the recording and reproduction condition is acquired. The adjustment information processing section determines whether the recording and reproduction condition is re-usable or needs to be updated, based on the version information.

In one embodiment of the invention, the version information includes history information concerning firmware for the information recording and reproduction apparatus.

According to still another aspect of the invention, an information recording and reproduction apparatus for an information recording medium including a drive information area for recording drive information including a plurality of recording and reproduction conditions includes an adjustment information processing section for determining whether or not the plurality of recording and reproduction conditions in the drive information area include a first recording and reproduction condition; when it is determined that the plurality of recording and reproduction conditions do not include the first recording and reproduction condition, determining whether or not the plurality of recording and reproduction conditions included in the drive information area include a second recording and reproduction condition; and when it is determined that the plurality of recording and reproduction conditions include the second recording and reproduction condition, calculating the first recording and reproduction condition using the second recording and reproduction condition in a predetermined condition formula. The information recording and reproduction apparatus further includes a recording and reproduction control section for performing recording and reproduction based on the calculated first recording and reproduction condition.

In one embodiment of the invention, the plurality of recording and reproduction conditions each define an operation condition when an information recording and reproduction apparatus performs data recording and reproduction.

In one embodiment of the invention, the adjustment information processing section records the calculated first recording and reproduction condition in the drive information area.

In one embodiment of the invention, the recording and reproduction control section performs a trial of data recording and reproduction with the calculated first recording and reproduction condition. The adjustment information processing section determines whether the drive information needs to be updated or the first recording and reproduction condition needs to be acquired by adjustment processing, based on a result of the trial of data recording and reproduction.

In one embodiment of the invention, the information recording medium further includes a data area for recording data. The data area is divided into a plurality of segmented areas in a radial direction of the information recording medium. Each of the plurality of recording and reproduction conditions corresponds to at least one of the plurality of segmented areas.

In one embodiment of the invention, the predetermined condition formula is a function of a radius of the information recording medium.

In one embodiment of the invention, the predetermined condition formula is a function of a linear velocity of the information recording medium.

In one embodiment of the invention, at least one of the plurality of segmented areas includes at least one recording and reproduction instruction area.

In one embodiment of the invention, a temperature range indicating a range of apparatus temperatures of the information recording and reproduction apparatus includes a plurality of segmented temperature ranges. Each of the plurality of recording and reproduction conditions corresponds to at least one of the plurality of segmented temperature ranges.

In one embodiment of the invention, the predetermined condition formula is a function of the apparatus temperature.

In one embodiment of the invention, the plurality of segmented areas each correspond to at least one zone in accordance with one of a ZCLV format and a ZCAV format.

In one embodiment of the invention, the drive information includes version information which indicates a condition at which the recording and reproduction conditions are acquired. The adjustment information processing section determines whether the plurality of recording and reproduction conditions are re-usable or need to be updated, based on the version information.

In one embodiment of the invention, the version information includes history information concerning firmware for the information recording and reproduction apparatus.

Thus, the invention described herein makes possible the advantages of providing an information recording medium, an information recording and reproduction method and an information recording and reproduction apparatus for obtaining appropriate recording and reproduction conditions.

These and other advantages of the present invention will become apparent to those skilled in the art upon reading and understanding the following detailed description with reference to the accompanying figures.

DESCRIPTION OF THE EMBODIMENTS

Figure 1:
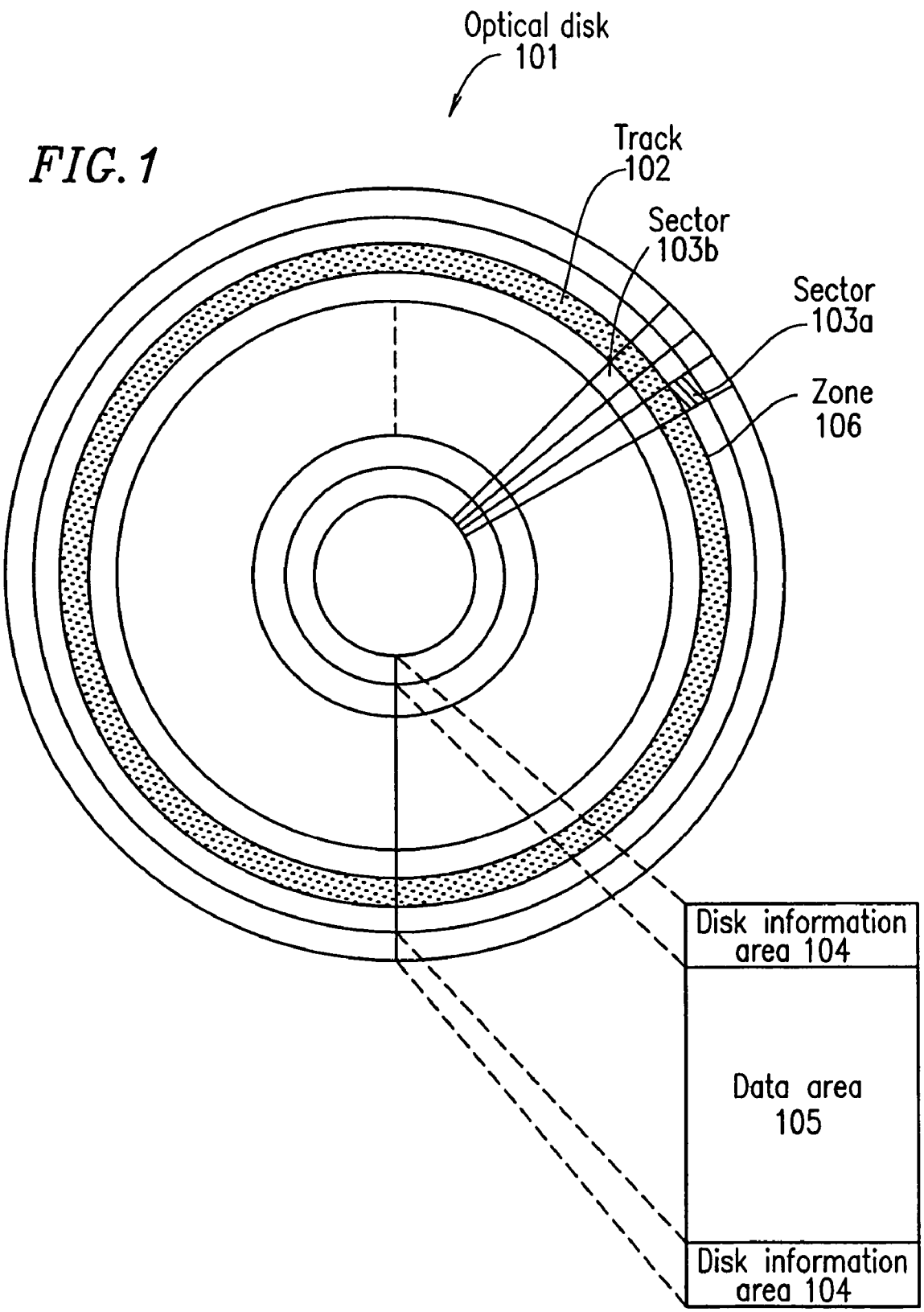
FIG. 1 shows a structure of an information recording medium according to a first example of the present invention.

An information recording medium according to the present invention has a recording and reproduction condition recorded in a drive information area thereof. The recording and reproduction condition corresponds to a segmented area of the information recording medium to which data is to be recorded, or corresponds to an ambient temperature at which data is recorded or reproduced. Due to such a structure, an optimum recording and reproduction condition can be read. A segmented area is obtained as a result of dividing the information recording medium in a radial direction thereof. One segmented area includes a recording and reproduction instruction area to which or from which at least recording or reproduction of a minimum unit of data is possible. An information recording medium includes a plurality of segmented areas. A plurality of recording and reproduction conditions can be recorded in an arbitrary memory in an information recording and reproduction apparatus on which the information recording medium is to be mounted. The recording and reproduction instruction area can include an area to which data is instructed to be recorded (recording instruction area), an area from which data is instructed to be reproduced (reproduction instruction area), or both.

When it is determined that a plurality of recording and reproduction conditions recorded in the drive information area do not include an optimum recording and reproduction condition, an optimum recording and reproduction condition is acquired by adjustment processing. The plurality of recording and reproduction conditions recorded in the drive information area are read, for example, the next time the information recording and reproduction apparatus is activated and used for recording and reproduction. The drive information area can also include information on an information recording and reproduction apparatus by which the recording and reproduction conditions recorded in the drive information area were obtained, and information on an information recording and reproduction apparatus on which the information recording medium is now mounted.

The adjustment of a recording and reproduction condition can be simplified by re-using the recording and reproduction conditions recorded in the drive information areas of the information recording medium. As a result, the time period required for adjustment of the recording and reproduction condition is made shorter, and thus the wait time required for adjustment is made shorter.

In this specification, the recording and reproduction condition is obtained by (1) acquiring a recording and reproduction condition by adjustment, (2) reading a recorded recording and reproduction condition, or (3) calculating a recording and reproduction condition. In this specification, the adjustment of a recording and reproduction condition refers to acquiring a recording and reproduction condition.

Herein, a recording and reproduction condition refers to an operation condition of an information recording and reproduction apparatus for recording information on an information recording medium or reproducing information recorded on the information recording medium.

Recording and reproduction conditions include at least one of (i) pulse conditions concerning a laser pulse for irradiating the information recording medium, (ii) servo conditions for determining various servo operations performed for recording and reproduction, and (iii) reproduction signal processing conditions for processing a reproduction signal.

The pulse conditions include, for example, a power value of a laser pulse for irradiating the information recording medium in recording. Alternatively, the pulse conditions can include laser pulse conditions for forming a mark (minimum unit of information) on the information recording medium. For forming a mark by irradiating the information recording medium with a plurality of pulses over an area between a front end to a rear end of the mark, the pulse conditions include at least one among the timing at which a first pulse corresponding to the front end of the mark is generated, the length of the first pulse, the intensity of the laser light of the first pulse, the timing at which a final pulse corresponding to the rear end of the mark is generated, the length of the final pulse, and the intensity of the laser light of the final pulse; and are determined in accordance with the length of the mark and the length of the spaces which interpose the mark therebetween.

The servo conditions indicate, for example, focus position conditions which show the distance between an objective lens and a recording and reproduction surface of the optical disc. Alternatively, the servo conditions can include tracking position conditions for causing the laser light directed to the optical disc to follow the track.

Alternatively, the recording and reproduction condition can be a set value of various circuits included in the information recording and reproduction apparatus or code information representing the set value.

In the following description, the recording power condition and the focus position condition will be described as specific examples of the recording and reproduction conditions, but the recording and reproduction conditions are not limited to these.

Hereinafter, the present invention will be described by way of illustrative examples with reference to the accompanying drawings.

EXAMPLE 1

FIG. 1 shows a structure of an information recording medium 101 according to a first example of the present invention. The information recording medium 101 can be any of a variety of types of optical discs such as, for example, a DVD-RAM disc. The optical disc 101, which is circular, has a plurality of tracks 102 formed in a concentric manner therein. Alternatively, the optical disc 101 has a single track 102 formed in a spiral manner therein or a plurality of tracks 102 formed in a spiral manner therein. Each track 102 is divided into a plurality of sectors 103. A zone 106 includes a plurality of tracks 102.

The optical disc 101 includes at least one disc information area 104 and a data area 105.

In the disc information area 104, various parameters required to access the optical disc 101 are recorded. The disc information areas 104 are located in, for example, the innermost peripheral portion and the outermost peripheral portion of the optical disc 101. The disc information area 104 located in the innermost peripheral portion of the optical disc 101 is referred to as a "lead-in area". The disc information area 104 located in the outermost peripheral portion of the optical disc 101 is referred to as a "lead-out area".

Data is recorded in and reproduced from the data area 105. Each of the sectors 103 provided in the data area 105 are assigned an absolute address referred to as a physical sector number (hereinafter, referred to as a "PSN").

Figure 2:
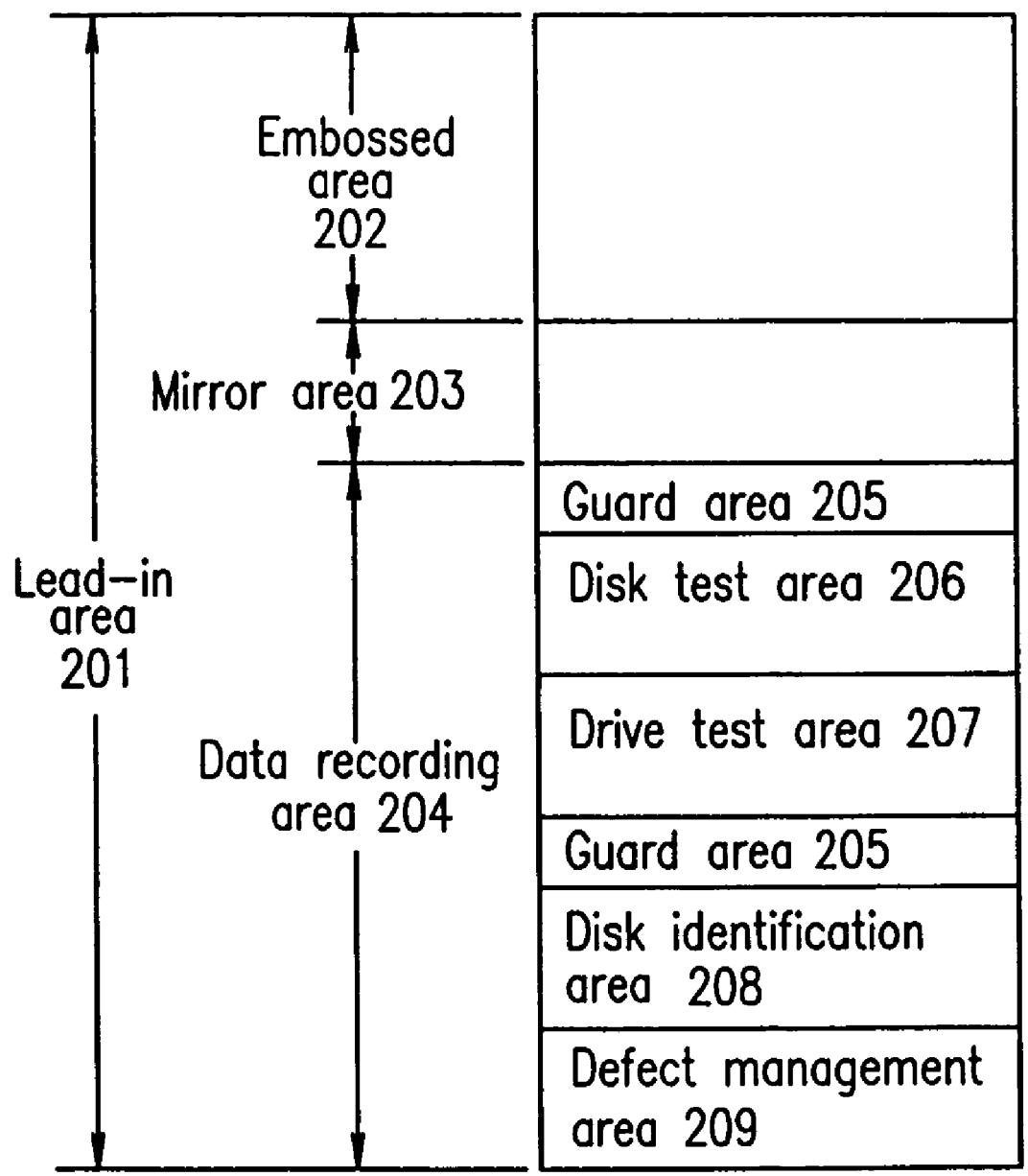
FIG. 2 shows a structure of a disc information area of an optical disc shown in FIG. 1.

FIG. 2 shows a structure of the disc information area 104 located in the innermost peripheral portion of the optical disc 101 shown in FIG. 1 (i.e., a lead-in area 201). The disc information area 104 located in the outermost peripheral portion of the optical disc 101 (FIG. 1) has an identical structure as that shown in FIG. 2.

The lead-in area 201 includes an embossed area 202 in which information such as, for example, identification information of the optical disc 101 is recorded by an embossed pit, a data recording area 204 in which data is to be recorded, and a mirror area 203 provided between the embossed area 202 and the data recording area 204.

The data recording area 204 includes guard areas 205 which do not include data, a disc test area 206 used for testing the quality of the optical disc 101 in a production process of the optical disc 101, a drive test area 207 used by an optical disc apparatus for checking the state of the optical disc 101 mounted on the optical disc apparatus, a disc identification area 208 used for recording information on, for example, various characteristics of the optical disc 101, and a defect management area 209 for recording defect management information.

Figure 3:
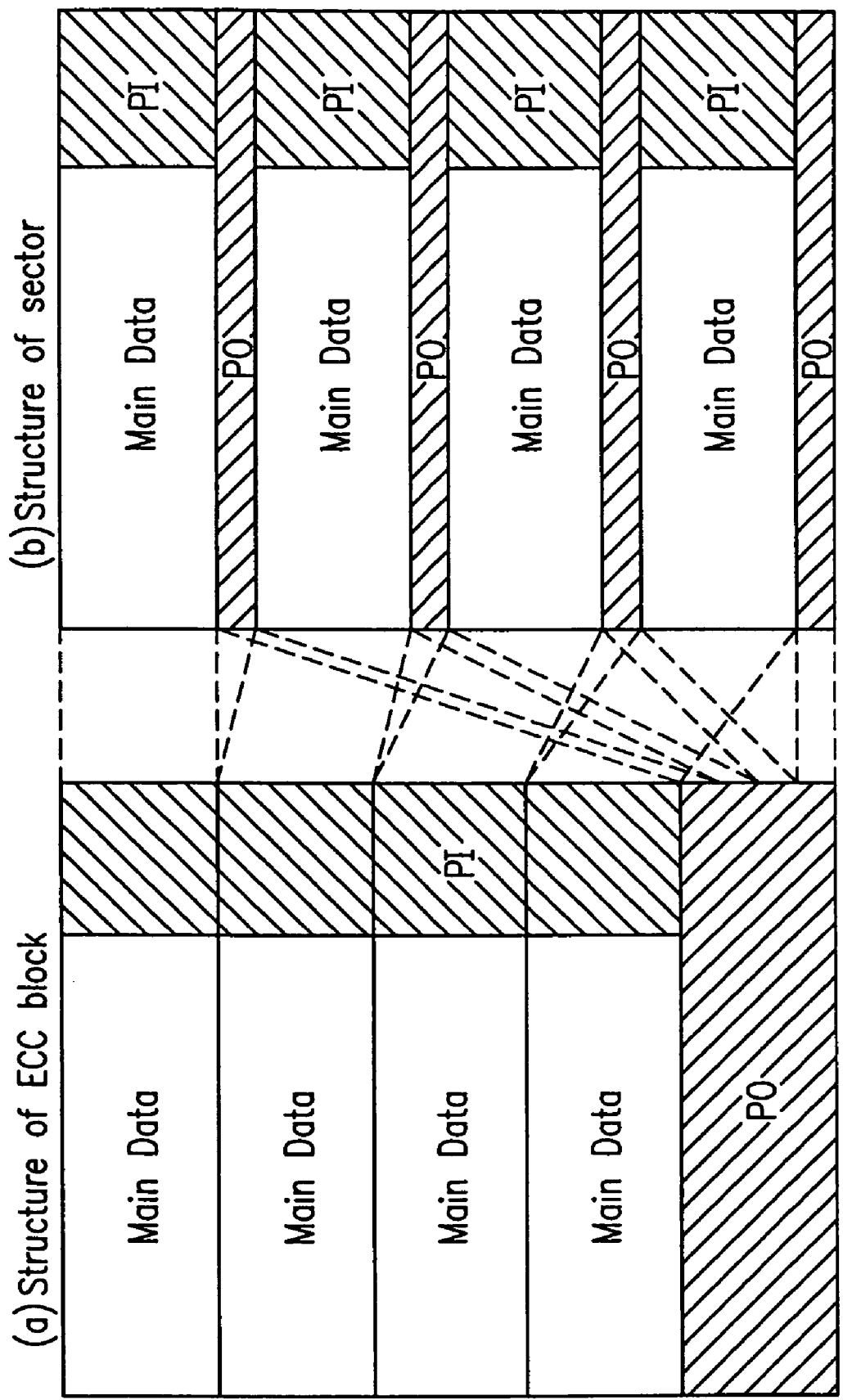
FIG. 3 shows a relationship between a structure of an ECC block and a sector of the optical disc shown in FIG. 1.

FIG. 3 shows the structural relationship between an ECC block and a sector 103 provided on the optical disc 101. The ECC block is a unit of calculation of an error correction code. In the case where the optical disc 101 is a large capacity optical disc (for example, a DVD), one ECC block is formed of 16 sectors in order to provide both high error correction capability and low redundancy. In the example shown in FIG. 3, one ECC block is assumed to be formed of four sectors for simplicity.

FIG. 3 shows a sector structure in part (a). An ECC block includes main data arranged in 172 bytes×48 rows, an inner code parity PI obtained by calculating an error correction code on a row-by-row basis of main data (i.e., in a horizontal direction), and an outer code parity PO obtained by calculating an error correction code on a column-by-column basis of main data (i.e., in a vertical direction).

A code including an inner code parity and an outer code parity is generally referred to as a product code. The product code is part of an error correction system which is very useful against both random errors, and burst errors (that is, locally concentrated errors). For example, it is assumed that a burst error for two rows is generated by a scratch in addition to random errors. The burst error is mostly a 2-byte error and thus is correctable by the outer code. In a column having many random errors, some of the random errors cannot be corrected by the outer code and remain as errors, which are then mostly corrected by the inner code. Even if some of the errors cannot be corrected by the inner code, those errors can be corrected using the outer code again. In this manner, the number of errors can be decreased. In the field of DVD, use of such a product code provides sufficient error correction capability while suppressing parity redundancy. In other words, the capacity for the user data can be increased by an amount corresponding to an amount of the parity redundancy suppressed.

FIG. 3 shows a sector structure in part (b). The outer code parity of the ECC block is uniformly divided for each of the sectors row-by-row. As a result, one sector is formed of data of 182 bytes×13 rows.

When an optical disc apparatus is instructed to perform reproduction from the optical disc 101 mounted thereon sector-by-sector, the optical disc apparatus reproduces the ECC block including a designated sector from the optical disc 101 and performs error correction. Then, the optical disc apparatus stores only the portion of data corresponding to the designated sector to the optical disc 101 in, for example, a buffer, and transfers the portion to an upper control apparatus. When the optical disc apparatus is instructed to perform recording on the optical disc 101 mounted thereon sector-by-sector, the optical disc apparatus reproduces the ECC block including a designated sector from the optical disc 101 and performs error correction. Then, the optical disc apparatus replaces the portion of data corresponding to the designated sector with data to be recorded, then re-calculates the error correction code and adds the error correction code to the data to be recorded, and records the ECC block including the designated sector to the optical disc 101.

In the following description, the term "block" refers to the ECC block described above.

Figure 4:
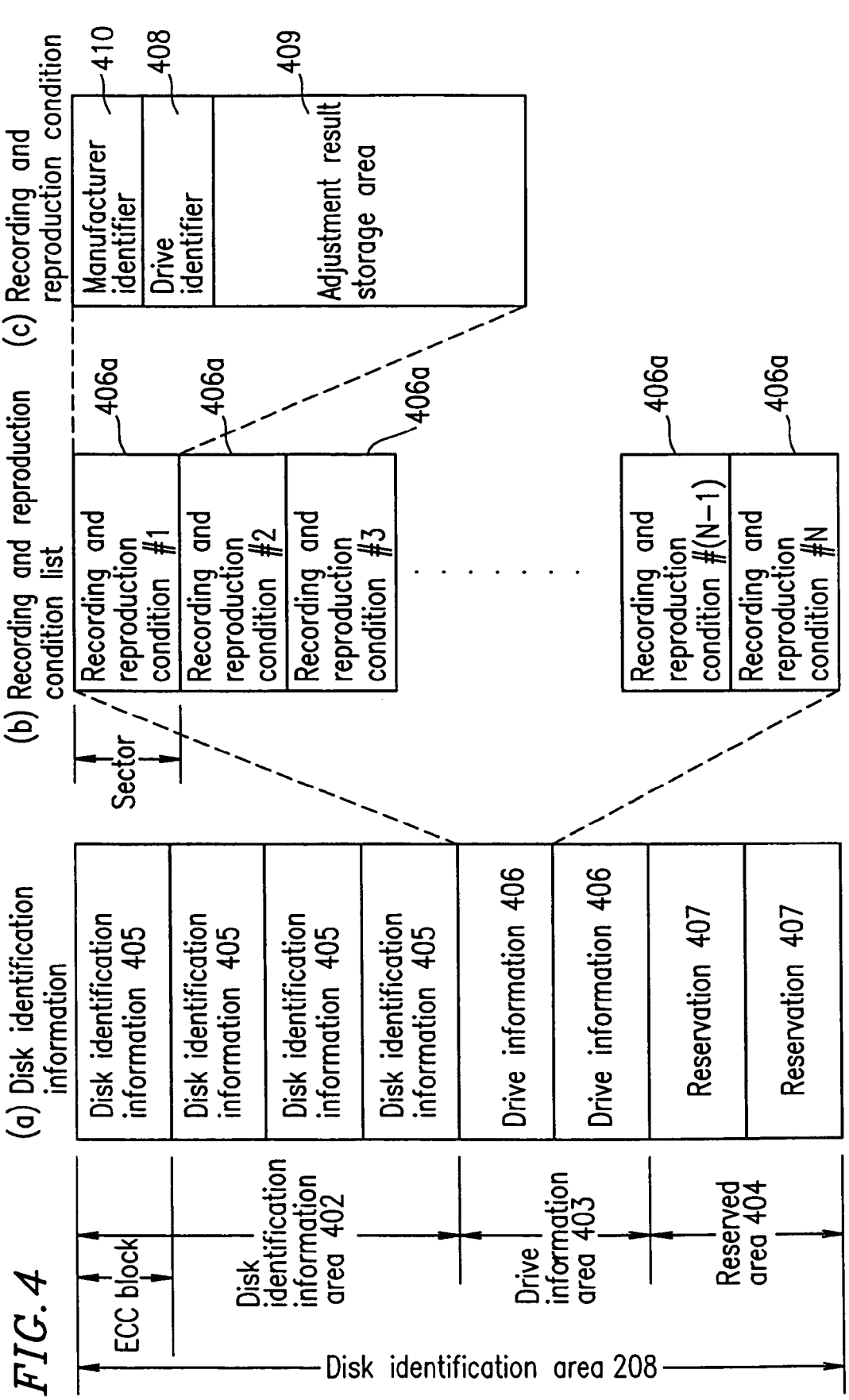
FIG. 4 shows a structure of drive information to be recorded in a disc identification area in the disc information area shown in FIG. 2.

FIG. 4 shows a structure of information to be recorded in the disc identification area 208 shown in FIG. 2. The disc identification area 208 includes a disc identification information area 402 formed of four ECC blocks, a drive information area 403 formed of two ECC blocks, and a reserved area 404 formed of two ECC blocks. The ECC blocks are used for calculating error correction codes. The error correction codes are calculated on an ECC block-by-ECC block basis.

In each of the ECC blocks of the disc identification information area 402, disc identification information 405 is to be recorded. In each of the ECC blocks of the drive information area 403, drive information 406 is to be recorded. In each of the ECC blocks of the reserved area 404, information concerning reservation 407 is to be recorded.

The drive information 406 is represented as, for example, a list of a plurality of recording and reproduction conditions 406a. Accordingly, the drive information 406 is also referred to as a "recording and reproduction condition list". Two ECC blocks can be updated so that the same recording and reproduction condition list is recorded in each of the two ECC blocks in which the drive information 406 is to be recorded.

In FIG. 4, the values after "#" are provided for the sake of convenience to indicate the time series order in which the recording and reproduction conditions 406a were recorded, and are not included in the contents of the recording and reproduction conditions 406a. Herein, "N" is an integer of 0 or greater. In the example shown in FIG. 4, each drive information 406 can include N recording and reproduction conditions 406a. Each of the N recording and reproduction conditions 406a is recorded in a respective sector.

The recording and reproduction conditions 406a are arranged in the order in which they were recorded. For example, the N recording and reproduction conditions 406a are arranged from the recording and reproduction condition 406a recorded at the latest time to the recording and reproduction condition 406a recorded at the earliest time.

Each recording and reproduction condition 406a includes a manufacturer identifier 410 for identifying the manufacturer of the optical disc apparatus, a drive identifier 408 for identifying the particular optical disc apparatus among various optical disc apparatuses manufactured by the manufacturer, and an adjustment result storage area 409 for recording results obtained by the adjustment.

Figure 5:
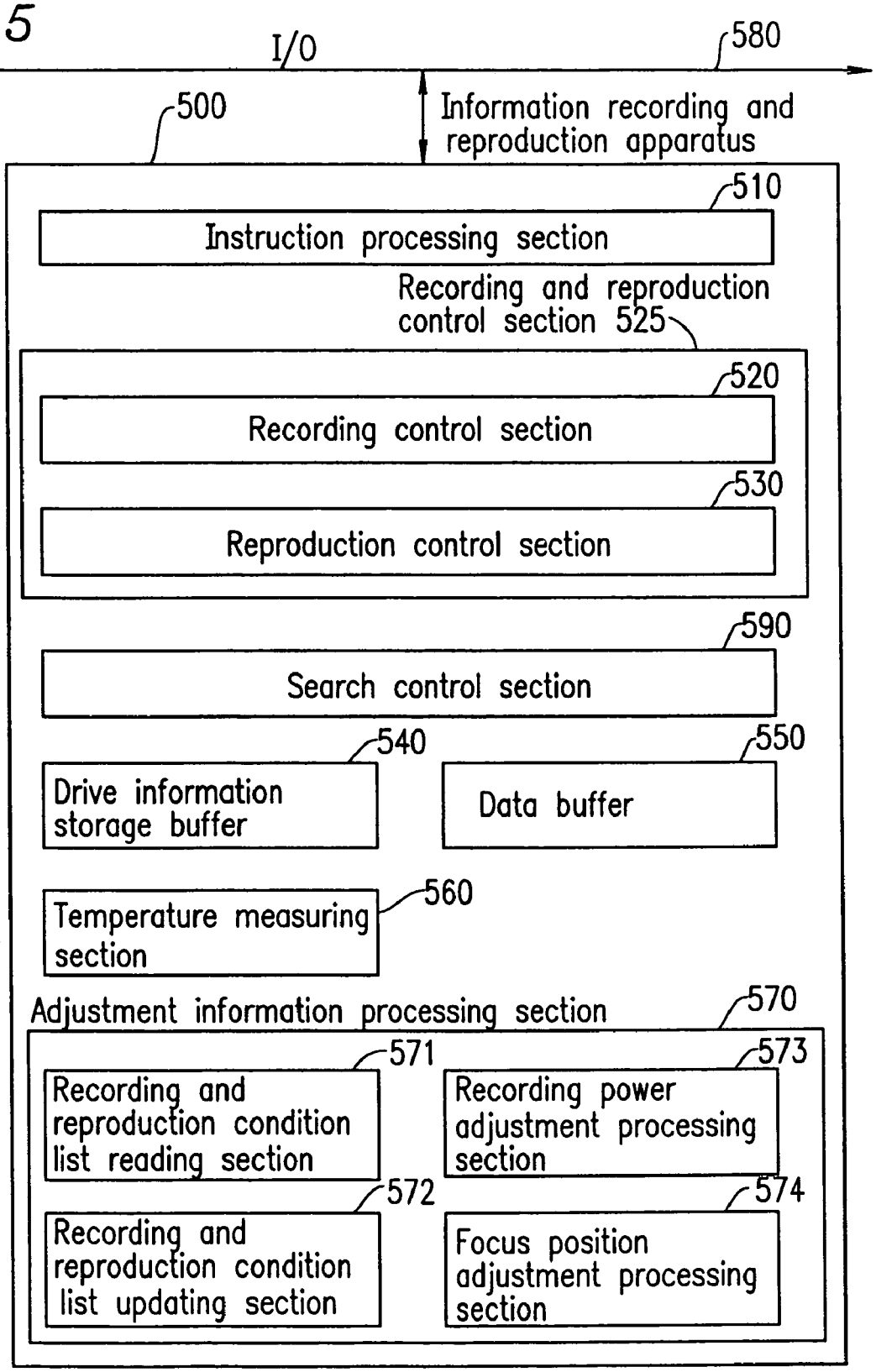
FIG. 5 shows a structure of an information recording and reproduction apparatus according to the first example of the present invention.

In the first example, a recording and reproduction condition corresponding to one of the plurality of segmented areas is acquired. The plurality of segmented areas are obtained as a result of dividing the optical disc 101 in a radial direction thereof. A FIG. 5 shows a diagrammable structure of an information recording and reproduction apparatus (for example, an optical disc apparatus) 500 in the first example.

The information recording and reproduction apparatus 500 is connected to an upper control apparatus (not shown, usually a host computer) via an I/O bus 580. The information recording and reproduction apparatus 500 includes, in terms of functions, an instruction processing section 510 for processing an instruction received from the upper control apparatus, a recording and reproduction control section 525 for controlling recording to or reproduction from the optical disc, a search control section 590 for controlling a search (described later), a drive information storage buffer 540 for storing reproduced drive information, a data buffer 550 for temporarily storing recording and reproduction data, a temperature measuring section 560 for measuring a temperature of the information recording and reproduction apparatus 500, and an adjusting information processing section 570 for controlling the drive information area and the recording power adjustment processing. The recording and reproduction control section 525 includes a recording control section 520 for controlling recording to the optical disc and a reproduction control section 530 for controlling reproduction from the optical disc. The "search" is a so-called seek operation, which is an operation for moving a head of the optical disc apparatus.

The adjusting information processing section 570 includes a recording and reproduction condition list reading section 571 for reading a recording and reproduction condition list from the drive information area 403 (FIG. 4), a recording and reproduction condition list updating section 572 for creating a recording and reproduction condition list and controlling recording of the created list to the drive information area, a recording power adjustment processing section 573 for controlling the recording power adjustment processing, and a focus position adjustment processing section 574 for obtaining an optimum focus position condition by focus position adjustment.

Hereinafter, a method for acquiring a recording and reproduction condition corresponding to each of the segmented areas in the first example will be described.

Figure 6A:
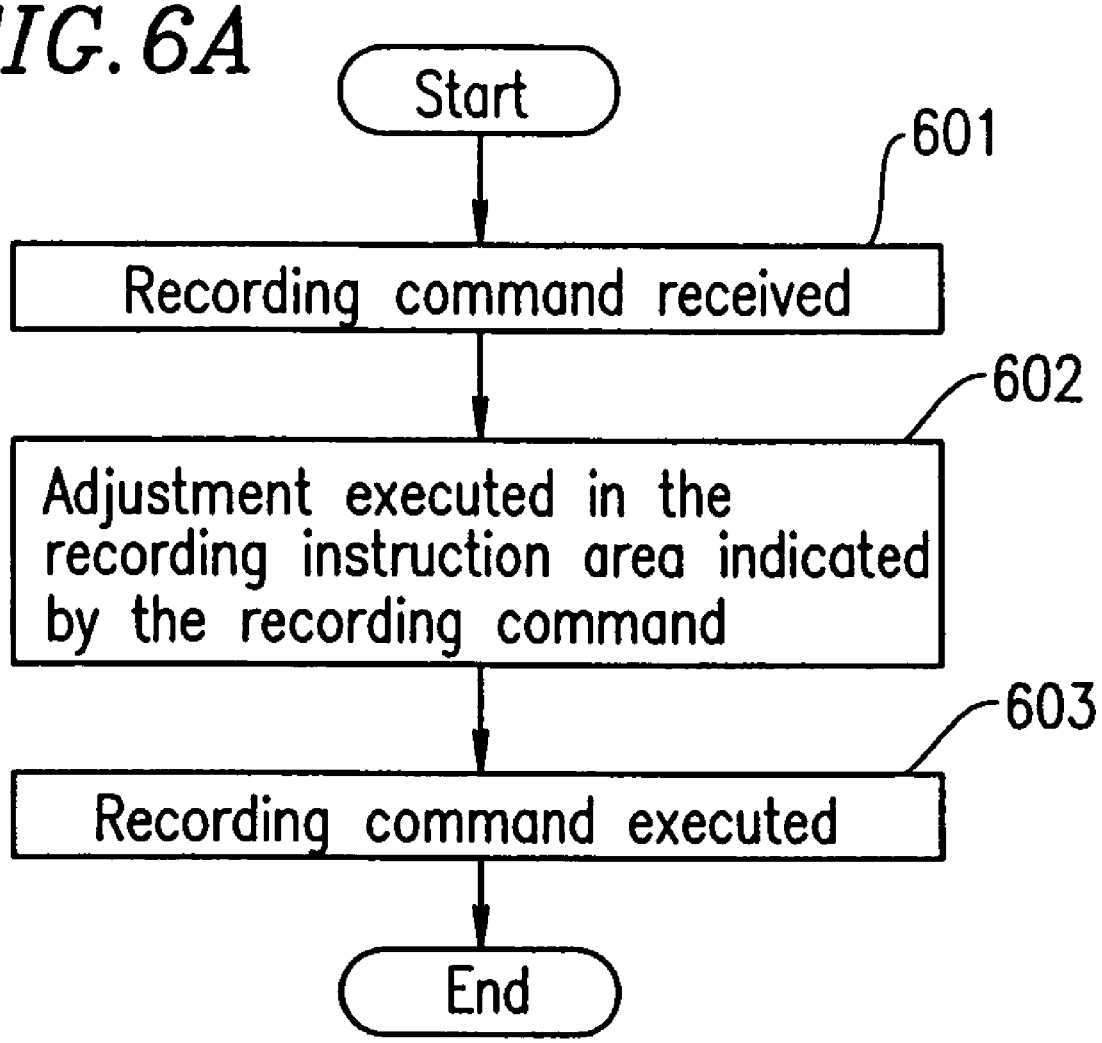
FIG. 6A is a flowchart illustrating a procedure of recording, and reproduction power adjustment according to the first example of the present invention.

FIG. 6A shows a procedure of recording power adjustment for acquiring a recording power condition corresponding to a radial position in a recording instruction area to which data is instructed to be recorded. The adjustment processing is executed by the recording control section 520 and the recording power adjustment processing section 573 of the information recording and reproduction apparatus 500 shown in FIG. 5. In this specification, an area for which adjustment for acquiring a recording and reproduction condition is performed will be referred to as an "adjustment area".

The recording control section 520 which has received a recording command through the instruction processing section 510 stores data to be recorded in the data buffer 550 and temporarily stops the recording processing (step 601). Next, the recording power adjustment processing section 573 executes recording power adjustment in a recording instruction area which is indicated by the recording command (step 602). After recording power adjustment is completed, the recording control section 520 uses a recording power condition acquired by recording power adjustment to record the data, which has been stored in the data buffer 550, in the recording instruction area indicated by the recording command (step 603).

As described above, the recording control section 520 temporarily stops the recording processing once and then uses the recording power adjustment processing section 573 to execute recording power adjustment in the recording instruction area which is indicated by the recording command. Then, the recording control section 520 uses the acquired recording power condition to execute the recording processing. In this manner, the recording instruction area indicated by the recording command is used for recording power adjustment. Accordingly, even data which was previously recorded in the recording instruction area is destroyed, the data to be recorded is recorded in the recording instruction area. Thus, no problem occurs. Thus, recording power adjustment can be performed so as to acquire the recording power condition corresponding to the recording instruction area without essentially destroying the user data. As a result, recording can be performed at an optimum recording power condition.

Figure 6B:
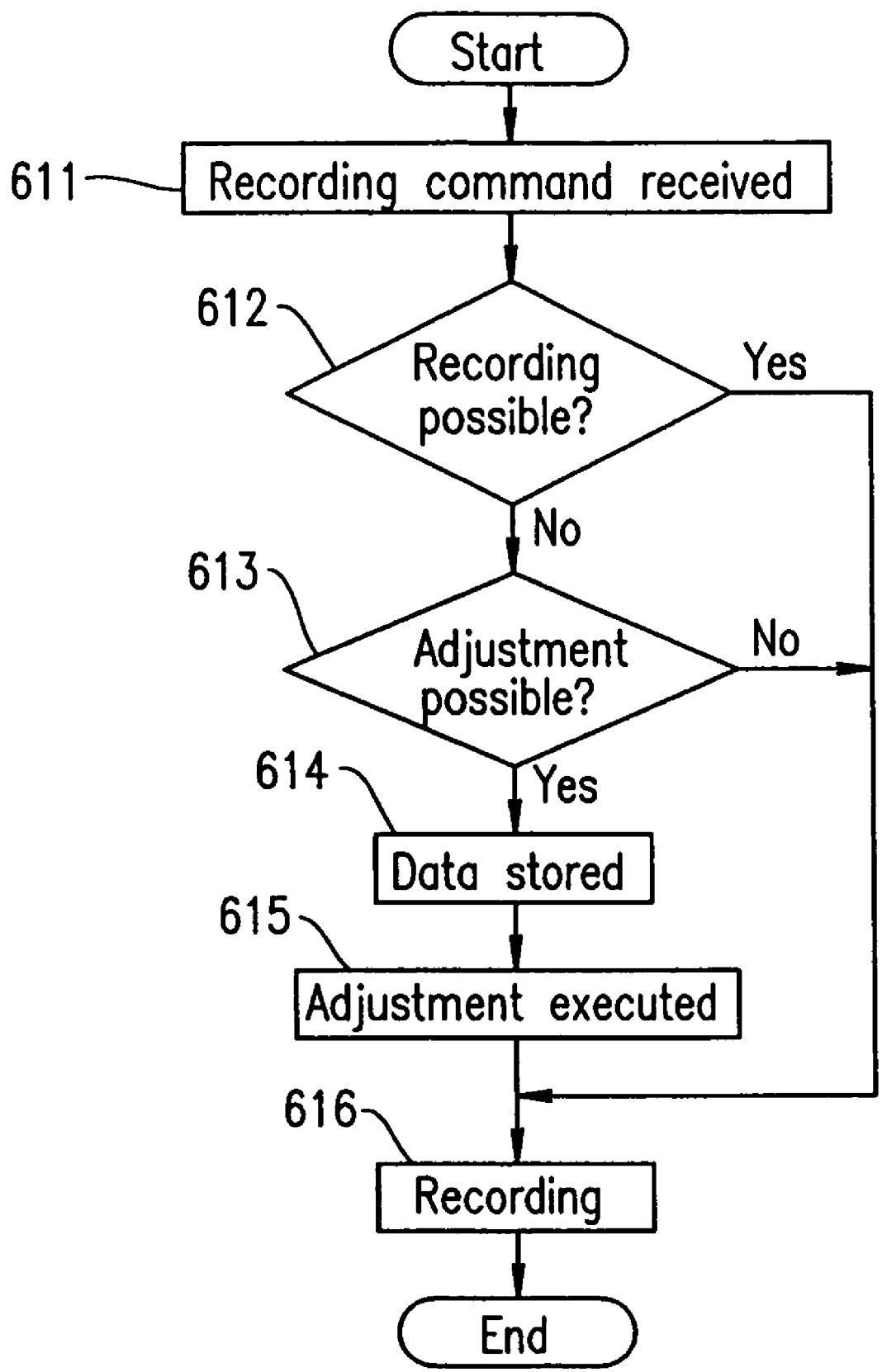
FIG. 6B is a flowchart illustrating another procedure of recording, and recording power adjustment according to the first example of the present invention.

FIG. 6B shows another procedure of recording power adjustment for acquiring a recording power condition corresponding to a recording instruction area according to the first example of the present invention. The recording control section 520 receives a recording command through the instruction processing section 510 (step 611). Next, the recording power adjustment processing section 573 determines whether or not it is possible to perform recording in a recording instruction area indicated by the recording command (step 612). When it is determined that recording is impossible, i.e., when a recording and reproduction condition which is appropriate to the recording instruction area has not been obtained, the recording power adjustment processing section 573 determines whether or not it is possible to perform recording power adjustment in the recording instruction area indicated by the recording command (step 613). The recording power adjustment processing section 573 can determine whether or not there is an area in which recording power adjustment needs to be performed as a basis for determining whether or not it is possible to perform recording power adjustment. When it is determined that recording power adjustment is possible, the recording control section 520 stores the data to be recorded in the data buffer 550 (step 614), and executes recording power adjustment (step 615). After recording power adjustment is completed, the recording control section 520 uses a recording power condition acquired by recording power adjustment to record the data, which has been stored in the data buffer 550, in the recording instruction area indicated by the recording command (step 616). When it is determined that recording is possible in step 612 (for example, when a recording and reproduction condition appropriate to an immediately neighboring recording instruction area is acquired and thus it is not necessary to acquire another recording and reproduction condition), or when it is determined that recording power adjustment is impossible in step 613, the recording control section 520 records the data in the recording instruction area indicated by the recording command without performing recording power adjustment.

As described above, all or a part of the recording instruction areas act as an adjustment area in the first example.

When data is to be recorded on the optical disc 101, which includes a plurality of segmented areas, data can be recorded in the following manner. A recording power condition acquired for a recording instruction area indicated by the recording command by one of the above-described procedures is stored in, for example, the drive information storage buffer 540 as a recording power condition for a segmented area including the recording instruction area. When a recording command indicating a recording instruction area included in the same segmented area is received, the recording power condition stored in the drive information storage buffer 540 is used to record the data in the recording instruction area. The recording power condition can be recorded in the drive information area 403 of the optical disc 101.

In the case of a DVD-RAM disc, a zone can be used as a segmented area. A recording and reproduction instruction area can include a sector or an ECC block including a sector.

The first example is not intended to always acquire a recording power condition for all the recording and reproduction areas, each of which is a minimum unit for data recording or reproduction. The first example is intended to obtain a recording power condition for each recording instruction area of the optical disc, or for each of the segmented areas obtained as a result of dividing the optical disc in a radial direction.

When recording is performed in a medium having different optimum recording power conditions in a land track and a groove track, recording power adjustment can be performed in the following manner. A border point between the land track and the groove track is searched for, and recording power adjustment is performed for an area including the border point. In this manner, the recording power condition for the land track and the recording power condition for the groove track can be acquired in the same step of operation.

The recording power adjustment is generally performed using a BER (byte error rate). Instead, jitter which indicates a time-wise delay between a reproduction signal and an input signal, or asymmetry which indicates a degree of asymmetry of a reproduction signal is usable.

In the above description, the recording power condition is described as a specific example of a recording and reproduction condition. The recording and reproduction condition is not limited to the recording power condition, but can be, for example, a recording pulse condition.

EXAMPLE 2

In a second example according to the present invention, adjustment of a recording and reproduction condition is executed in a spare area which is in the vicinity of a recording and reproduction instruction area, which is a target of data recording and reproduction. Thus, a recording and reproduction condition corresponding to the recording and reproduction instruction area is acquired. The information recording and reproduction apparatus used in the second example has the same structure as that of the structure shown in FIG. 5 and will not be described here.

Figure 7:
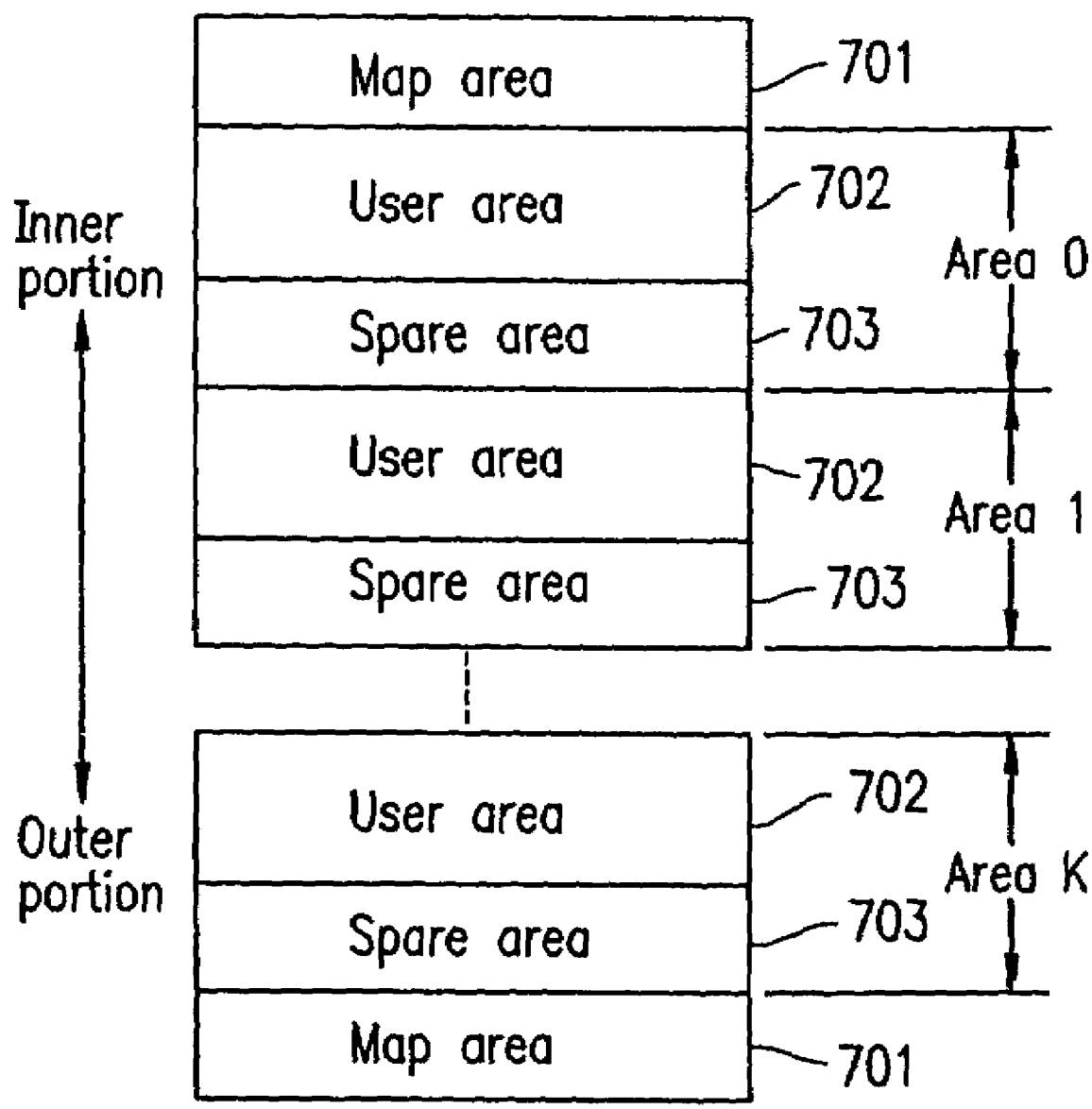
FIG. 7 shows a format of an optical disc according to a second example of the present invention.

FIG. 7 shows one example of a format of an optical disc including a spare area. An upper part of FIG. 7 corresponds to an inner portion of the optical disc, and a lower part of FIG. 7 corresponds to an outer portion of the optical disc. For example, a 2.6 GB DVD-RAM has such a format.

In the second example, the optical disc includes a map area 701, a user area 702, and a spare area 703. The map area 701 is an area for recording information on substitute processing, and the user area 702 is an area for recording user data. The spare area 703 includes a sector usable for substitute processing when the user area 702 includes a defective sector. The user area 702 is provided adjacent to the corresponding spare area 703. The map area 701 can be provided so as to interpose areas 0 through K. Herein, K is an integer of 0 or greater. A segmented area includes at least one user area 702 and at least one spare area 703. The user area 702 and the spare area 703 each include at least one recording and reproduction instruction area.

In the examples described in this specification, areas 0 through K are segmented areas; however, areas 0 through K can be recording and reproduction instruction areas.

Hereinafter, a method for acquiring a recording and reproduction condition corresponding to an area which is a target of recording and reproduction according to the second example of the present invention will be described.

Figure 8:
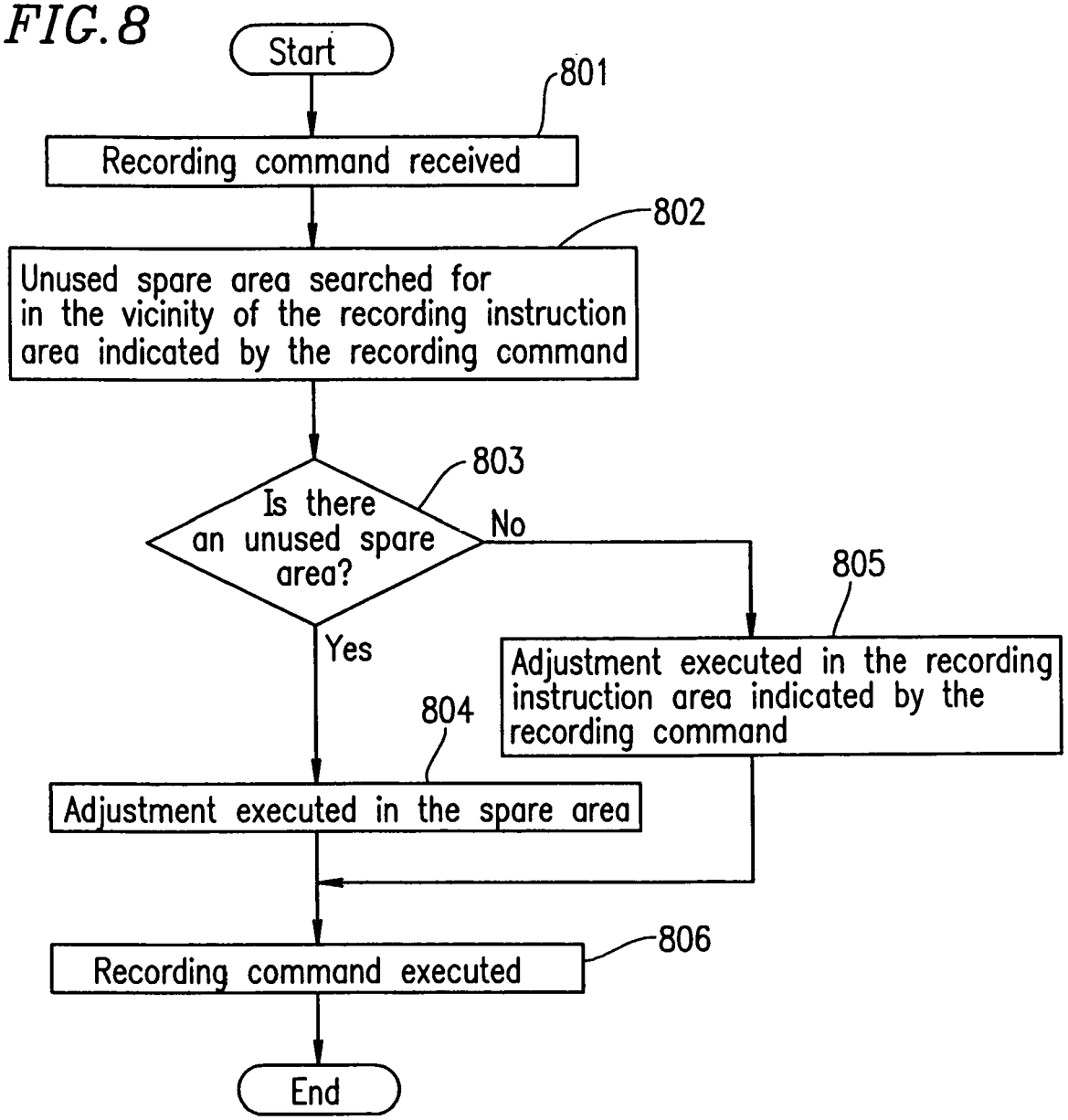
FIG. 8 is a flowchart illustrating a procedure of recording, and recording power adjustment according to the second example of the present invention.

FIG. 8 shows a procedure of recording power adjustment for acquiring a recording and reproduction condition. The procedure is executed by the recording control section 520 and a recording power adjustment processing section 573 of the information recording and reproduction apparatus 500 shown in FIG. 5.

The recording control section 520 which has received a recording command through the instruction processing section 510 stores data to be recorded in the data buffer 550 and temporarily stops the recording processing (step 801). Next, the recording power adjustment processing section 573 uses information recorded in the map area 701 to perform a search to determine whether or not there is an unused spare area 703 in the vicinity of a recording instruction area indicated by the recording command (step 802). When there is such an unused spare area 703 ("yes" in step 803), the recording power adjustment processing section 573 executes recording power adjustment in such an unused spare area 573 (step 804). When there is no such unused spare area 703 ("no" in step 803), the recording power adjustment processing section 573 executes recording power adjustment in the recording instruction area indicated by the recording command (step 805). After recording power adjustment is completed, the recording control section 520 uses a recording power condition acquired by recording power adjustment to record the data, which has been stored in the data buffer 550, in the recording instruction area indicated by the recording command (step 806).

As described above, the recording control section 520 temporarily stops the recording processing once and then uses the recording power adjustment processing section 573 to execute recording power adjustment in the spare area 703 or in the recording instruction area which is indicated by the recording command. Then, the recording control section 520 uses the acquired recording power condition to execute the recording processing. Accordingly, recording power adjustment can be performed so as to acquire the recording power condition corresponding to the recording instruction area. As a result, recording can be performed at an optimum recording and reproduction condition.

In general, the number of times data can be recorded in a data area is limited. The user areas 702 (FIG. 7) can be prevented from deteriorating due to recording power adjustment by enhancing the possibility of using each spare area 703 as an adjustment area.

When data is to be recorded on an optical disc including a segmented area which includes at least one user area 702 and at least one spare area 703, data can be recorded in the following manner. A recording power condition acquired for a recording instruction area indicated by the recording command by the above-described procedure is stored in, for example, the drive information storage buffer 540 as a recording power condition for a segmented area including the recording instruction area. When a recording command indicating a recording instruction area included in the same segmented area is received, the recording power condition stored in the drive information storage buffer 540 is used to record the data in the recording instruction area. The recording power condition can be recorded in the drive information area 403 (FIG. 4) of the optical disc.

The second example is not intended to always acquire a recording power condition for all the recording and reproduction areas, each of which is a minimum unit for data recording or reproduction. The second example is intended to obtain a recording power condition for each recording instruction area of the optical disc, or for each of the segmented areas.

In the above description, recording and reproduction performed to and from a data area is described. Instead, the recording and reproduction condition can be used to record data or reproduce data from a lead-in area or a lead-out area.

When recording is performed in an information recording medium having different optimum recording power conditions in a land track and a groove track, recording power adjustment can be performed in the following manner. A border point between the land track and the groove track is searched for, and recording power adjustment is performed for an area including the border point. In this manner, the recording power condition for the land track and the recording power condition for the groove track can be acquired in the same operation step.

The recording power adjustment is generally performed using a BER. Instead, jitter which indicates a time-wise delay between a reproduction signal and an input signal, or asymmetry which indicates a degree of asymmetry of a reproduction signal is usable.

In the above description, the recording power condition is described as a specific example of a recording and reproduction condition. The recording and reproduction condition is not limited to the recording power condition, but can be, for example, a recording pulse condition.

EXAMPLE 3

In a third example according to the present invention, an information recording medium including an adjustment-only area is used. The adjustment-only area is provided in the vicinity of a segmented area including a recording instruction area, which is a target of data recording and reproduction, and is used only for adjustment of a recording and reproduction condition. Adjustment of a recording and reproduction condition is executed in an adjustment-only area in the vicinity of the recording instruction area. Thus, a recording and reproduction condition corresponding to the recording instruction area is acquired. The information recording and reproduction apparatus used in the third example has the same structure as that of the structure shown in FIG. 5 and will not be described here.

Figure 9:
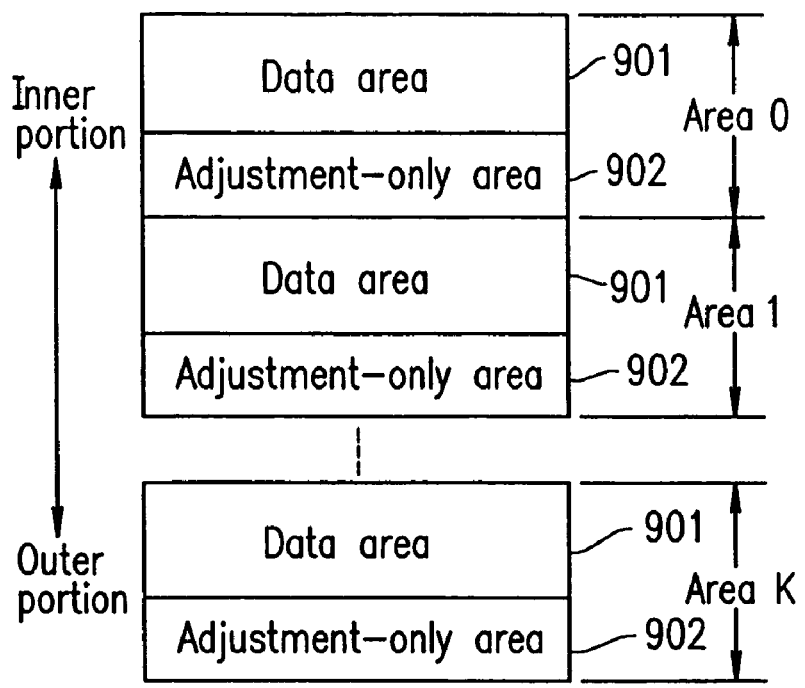
FIG. 9 shows a format of an optical disc according to a third example of the present invention.

FIG. 9 shows one example of a format of an optical disc used in the third example. An upper part of FIG. 9 corresponds to an inner portion of the optical disc, and a lower part of FIG. 9 corresponds to an outer portion of the optical disc. An adjustment-only area 902 is used only for adjustment of a recording and reproduction condition. In the example shown in FIG. 9, each of areas 0 through K include a data area 901 and an adjustment-only area 902. The present invention is not limited to such a structure, where one adjustment-only area 902 can be provided for a plurality of data areas 901. Herein, K is an integer of 0 or greater.

Hereinafter, a method for acquiring a recording and reproduction condition corresponding to an area which is a target of recording and reproduction according to the third example of the present invention will be described.

Figure 10:
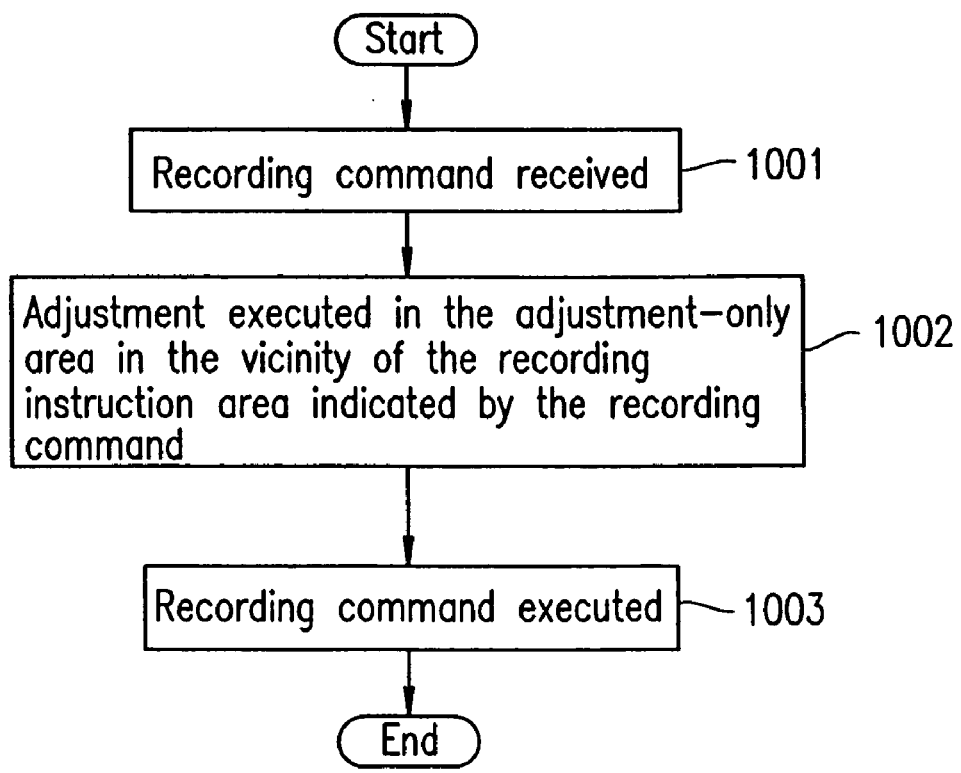
FIG. 10 is a flowchart illustrating a procedure of recording, and recording power adjustment according to the third example of the present invention.

FIG. 10 shows a procedure of recording power adjustment for acquiring a recording and reproduction condition. The procedure is executed by the recording control section 520 and a recording power adjustment processing section 573 of the information recording and reproduction apparatus 500 shown in FIG. 5.

The recording control section 520 which has received a recording command through the instruction processing section 510 stores data to be recorded in the data buffer 550 and temporarily stops the recording processing (step 1001). Next, the recording power adjustment processing section 573 executes recording power adjustment in an adjustment-only area 902 in the vicinity of a recording instruction area indicated by the recording command (step 1002). After recording power adjustment is completed, the recording control section 520 uses a recording power condition acquired by recording power adjustment to record the data, which has been stored in the data buffer 550, in the recording instruction area indicated by the recording command (step 1003).

As described above, the recording control section 520 temporarily stops the recording processing once and then executes recording power adjustment in the adjustment-only area 902 using the recording power adjustment processing section 573. Then, the recording control section 520 uses the acquired recording power condition to execute the recording processing. Accordingly, recording power adjustment can be performed so as to acquire the recording power condition corresponding to the recording instruction area. As a result, recording can be performed at an optimum recording and reproduction condition.

In general, the number of times data can be recorded in a data area 901 is limited. By using the adjustment-only area 902 as an adjustment area, one can save the effort necessary in searching for an adjustment area in which recording power adjustment can be performed. Consequently, the wait time required for adjustment can be made shorter, and the probability that adjustment is established can be improved (namely, the probability that adjustment cannot be performed due to the lack of an adjustment area is reduced) In addition, the data area 901 can be prevented from being deteriorated due to recording power adjustment.

When data is to be recorded on an optical disc which includes a plurality of recording instruction areas each including a data area and an adjustment-only area, data can be recorded in the following manner. A recording power condition acquired for a recording instruction area indicated by the recording command by the above-described procedure is stored in, for example, the drive information storage buffer 540 as a recording power condition for a segmented area including the recording instruction area. When a recording command indicating a recording instruction area included in the same segmented area is received, the recording power condition stored in the drive information storage buffer 540 is used to record the data in the recording instruction area.

The third example are not intended to always acquire a recording power condition for all of the recording and reproduction areas, each of which is a minimum unit for data recording or reproduction. The third example is intended to obtain a recording power condition for each recording instruction area of the optical disc, or for each of the segmented areas.

When recording is performed in a medium having different optimum recording power conditions in a land track and a groove track, recording power adjustment can be performed in the following manner. A border point between the land track and the groove track is searched for, and recording power adjustment is performed for an area including the border point. In this manner, the recording power condition for the land track and the recording power condition for the groove track can be found in the same operation step.

The recording power adjustment is generally performed using a BER. Instead, jitter which indicates a time-wise delay between a reproduction signal and an input signal, or asymmetry which indicates a degree of asymmetry of a reproduction signal is usable.

In the above description, the recording power condition is described as a specific example of a recording and reproduction condition. The recording and reproduction condition is not limited to the recording power condition, but can be, for example, a recording pulse condition.

EXAMPLE 4

In a fourth example according to the present invention, an information recording medium which includes, in the drive information area 403, recording and reproduction conditions each corresponding to one of a plurality of different segmented areas and also corresponding to a temperature of an information recording and reproduction apparatus is used. The information recording medium used in the fourth example also includes version information which indicates a condition at which the recording and reproduction conditions have been acquired.

Hereinafter, a method in the fourth example for acquiring a recording and reproduction condition corresponding to a segmented area, which is a target of data recording and reproduction, and also corresponding to one of a plurality of temperatures of an information recording and reproduction apparatus will be described. In the fourth example, a recording power condition is used as an example of a recording and reproduction condition.

Figure 11:
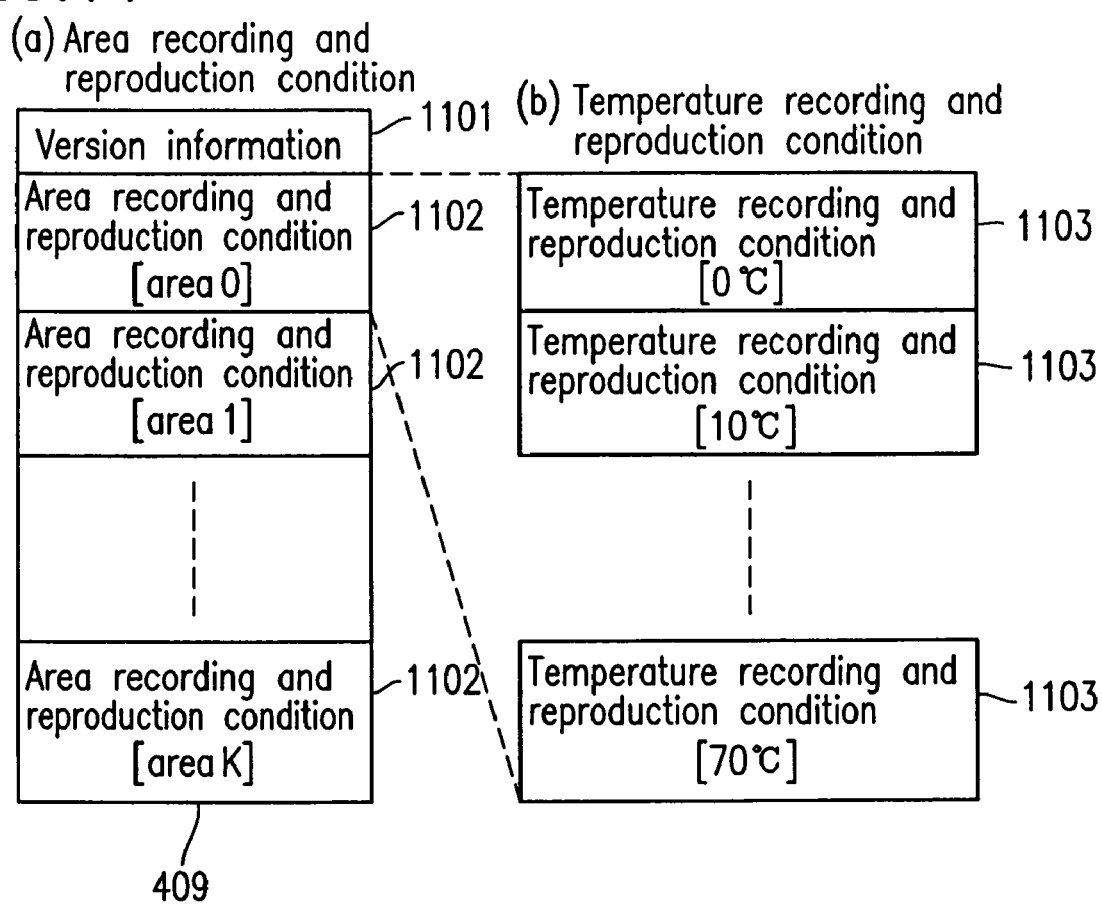
FIG. 11 is a structure of area recording and reproduction conditions and temperature recording and reproduction conditions according to a fourth example of the present invention.

FIG. 11 shows a structure of the adjustment result storage area 409 shown in FIG. 4. The adjustment result storage area 409 has version information 1101 and a plurality of area recording and reproduction conditions 1102 recorded therein. The version information 1101 includes, for example, history information of a program (firmware) for controlling a built-in microprocessor in the information recording and reproduction apparatus, the history information being included in the recording and reproduction condition 406a. The plurality of area recording and reproduction conditions 1102 respectively correspond to a plurality of areas of an optical disc (areas 0 through K). Each area recording and reproduction condition 1102 include, for example, a recording power condition corresponding to an area (one of the areas 0 through K). Herein, K is an integer of 0 or greater. In the fourth example, the plurality of area recording and reproduction conditions 1102 each include a plurality of temperature recording and reproduction conditions 1103.

The plurality of temperature recording and reproduction conditions 1103 respectively correspond to a plurality of segmented temperature ranges of an optical disc apparatus. The plurality of segmented temperature ranges of the optical disc apparatus are obtained as a result of dividing a temperature range at which the optical disc apparatus can be operated.

In FIG. 11, the temperature recording and reproduction conditions 1103 each correspond to one of the segmented temperature ranges of the optical disc apparatus. At the one of the segmented temperature ranges, recording power adjustment was performed in an area (one of areas 0 through K) indicated by the corresponding area recording and reproduction condition 1102. Accordingly, the acquired recording power condition is included in the temperature recording and reproduction condition 1103 which corresponds to the area in which recording power adjustment was performed and also corresponds to the segmented temperature range at which the recording power adjustment was performed. The version information 1101 can include history information on the hardware of the information recording and reproduction apparatus. In such a case, the version information 1101 is usable for, for example, determining whether or not the recording and reproduction condition acquired before the apparatus is repaired is still appropriate after the apparatus is repaired. The version information 1101 can include history information on a recording and reproduction condition. In such a case, the version information 1101 allows the recording and reproduction condition to be set, for example, not to be used more than 100 times.

In the fourth example, as described above, the drive information area 403 has drive information 406 (a recording and reproduction condition list) recorded therein. The drive information 406 includes a recording power condition acquired by recording power adjustment for each of a plurality of segmented areas of the optical disc, and furthermore, for each of a plurality of segmented temperature ranges of the optical disc apparatus at which the recording power adjustment was performed. The plurality of segmented temperature ranges are provided for each segmented area. The next time the optical disc apparatus is activated, the drive information 406 (the recording and reproduction condition list) is read from the drive information area 403 and used when recording power adjustment is necessary. In this manner, the time period required for recording power adjustment can be made shorter, and thus the wait time required for adjustment can be made shorter.

Hereinafter, a method for updating a recording and reproduction condition using the version information 1101 will be described. It is assumed that, for example, an information recording medium having a recording and reproduction condition recorded therein by an information recording and reproduction apparatus is mounted on the same information recording and reproduction apparatus having a altered version of the firmware. In the case where the recording and reproduction condition includes information depending on the firmware, the recording and reproduction condition is not usable with the altered firmware. Accordingly, it is necessary to newly obtain, for example, a recording power condition for recording power adjustment. When this occurs, the version information 1101 is referred to. In the recording and reproduction condition, a portion which is still usable is re-used. A portion which is not usable anymore is deleted from the recording and reproduction condition, and is replaced with a newly acquired portion. Thus, the recording and reproduction condition is updated. Such updating processing is also used to conform the information recording and reproduction apparatus to a change in the optimum recording and reproduction condition in accordance with an over-time change of the apparatus itself, due to repair of a component of the apparatus or the like.

As described above, when updating a recording and reproduction condition referring to the version information 1101, it is determined whether or not the recording and reproduction condition previously recorded, for example, a change in the firmware, is re-usable after the change. Therefore, it is possible to keep a portion of the recording and reproduction condition which is re-usable even after the change, and thus the wait time required for adjustment is made shorter the next time the apparatus is activated.

In the fourth example, the version information 1101 is recorded in the adjustment result storage area 409, but the present invention is not limited to such a structure. For example, the version information 1101 can be included in a drive identifier 408 (FIG. 4).

In the above description, the segmented temperature ranges are apparatus temperatures of the information recording and reproduction apparatus. The present invention is not limited to this. For example, the segmented temperature ranges can be ambient temperatures of an information recording medium.

In the case where the information recording medium of a ZCAV (zone constant angular velocity) format or a ZCLV (zoneconstant linear velocity) format, a plurality of areas obtained as a result of dividing an information recording medium in a radial direction can be provided as zones. The ZCAV format provides zones so that the rotation velocity of each zone is constant when the optical disc is rotated. The ZCLV format provides zones so that the linear velocity of each zone is constant when the optical disc is rotated.

In the above description, the recording power condition is described as a specific example of a recording and reproduction condition. The present invention is not limited to this, where the recording and reproduction condition can be a recording pulse condition.

In FIG. 11, each area recording and reproduction condition 1102 includes a plurality of temperature recording and reproduction conditions 1103 for the range of 0° C. to 70° C., and each temperature recording and reproduction condition 1103 covers a segmented temperature range of 10 degrees (0° C. to 10° C., etc.). The present invention is not limited to this. A recording and reproduction condition appropriate to the segmented area and/or the segmented temperature range can be acquired so long as the drive information area includes at least one of area recording and reproduction conditions or temperature recording and reproduction conditions.

EXAMPLE 5

In a fifth example according to the present invention, the information recording medium used in the fourth example is used. The information recording and reproduction apparatus used in the fifth example has substantially the same structure as that shown in FIG. 5 and will not be described here.

Hereinafter, a method in the fifth example for obtaining a recording and reproduction condition corresponding to a segmented area and a segmented temperature range of an optical disc apparatus will be described.

Figure 12:
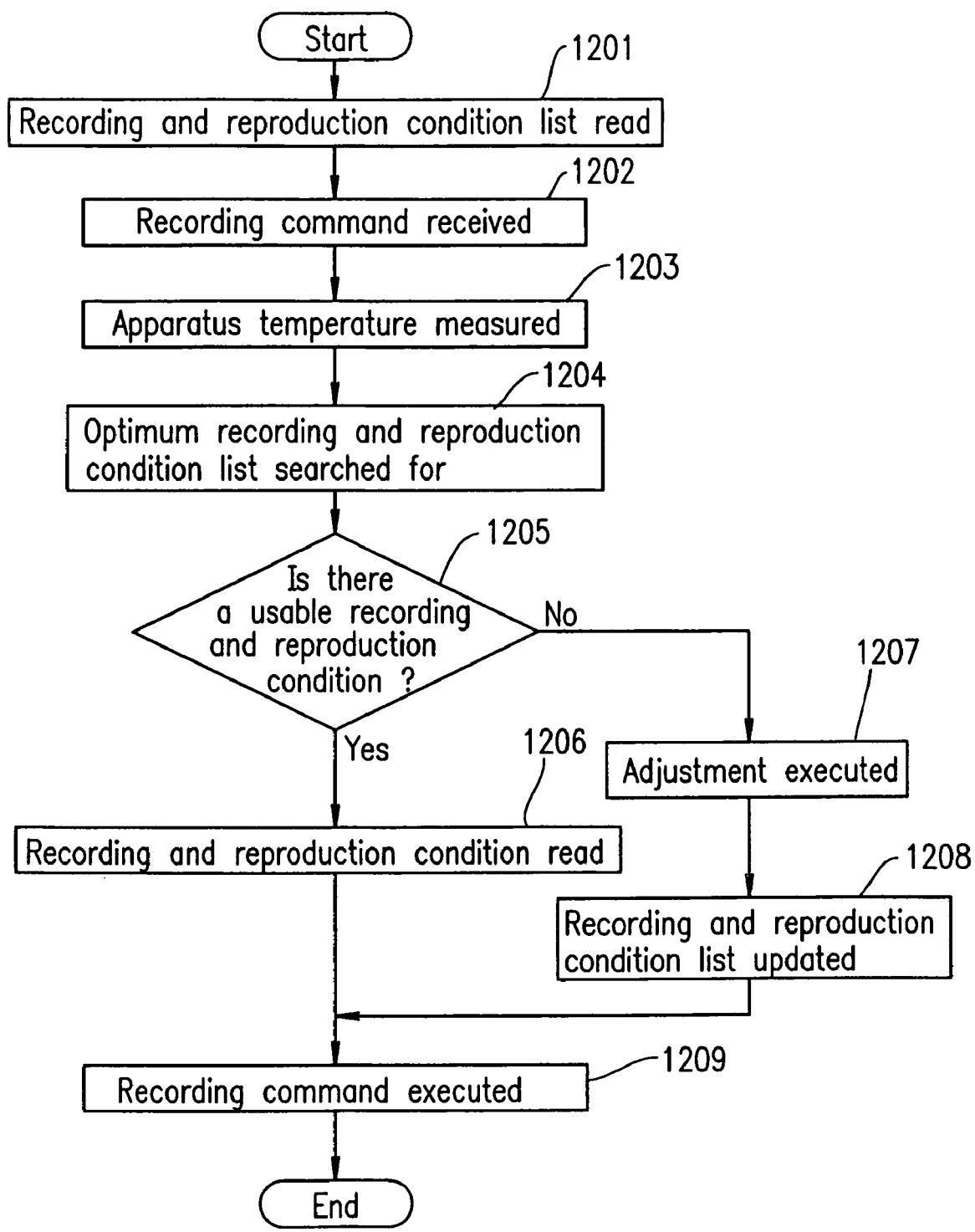
FIG. 12 is a flowchart illustrating a procedure of recording, reading of a recording and reproduction condition list, recording power adjustment, and updating of the recording and reproduction condition list according to a fifth example of the present invention.

FIG. 12 shows a procedure of recording, recording power adjustment, reading of a recording and reproduction condition list, and updating of the recording and reproduction condition list. The procedure is performed by the recording control section 520, the recording power adjustment processing section 573, the recording and reproduction condition list reading section 571, and the recording and reproduction condition list updating section 572 of the information recording and reproduction apparatus 500 (FIG. 5).

After the optical disc apparatus 500 is activated or after an optical disc is mounted on the optical disc apparatus 500, the recording and reproduction condition list reading section 571 reads a recording and reproduction condition list from the drive information area 403 and records the list in the drive information storage buffer 540 (step 1201). Next, the recording control section 520 which has received a recording command through the instruction processing section 510 (step 1202) measures a temperature of the optical disc apparatus (step 1203). Then, the recording and reproduction condition list reading section 571 searches the recording and reproduction condition list recorded in the drive information storage buffer 540 for a recording power condition which is appropriate for a recording instruction area indicated by the recording command and also appropriate for the temperature of the optical disc apparatus (step 1204). This search operation includes, for example, examining whether each of the recording and reproduction conditions included in the recording and reproduction condition list includes a manufacturer identifier and a drive identifier which matches those of the optical disc apparatus 500.

When there is a recording and reproduction condition including a manufacturer identifier and a drive identifier which matches those of the optical disc apparatus 500, the following processing is performed. First, a temperature recording and reproduction condition 1103 which corresponds both to an area recording and reproduction condition 1102 corresponding to a segmented area including a recording instruction area indicated by the recording command and to a segmented temperature range for the optical disc apparatus 500 is searched for in an adjustment result storage area 409 of the recording and reproduction condition. Then, it is determined whether or not an effective recording power condition is recorded in the corresponding segmented area and in the corresponding segmented temperature range. For example, the determination is conducted as follows. In the case where the recording power condition is represented by two hexadecimal numerals, when the recording power condition is represented by a value of 00h, which cannot be the recording power condition, it is determined that no recording power condition is recorded: and when the recording power condition is represented by a value other than 00h, it is determined that a recording power condition is recorded. The method for determination is not limited to this method.

When, as a result of the search in step 1204, it is determined that a usable recording power condition is included in the recording and reproduction condition list ("yes" in step 1205), the recording control section 520 reads the usable recording power condition (step 1206), and uses the recording power condition to execute recording processing (step 1209). When, as a result of the search in step 1204, it is determined that no usable recording power condition is included in the recording and reproduction condition list ("no" in step 1205), the recording power adjustment processing section 573 stores the data to be stored in the data buffer 550 and temporarily stops the recording processing. Then, the recording power adjustment processing section 573 executes recording power adjustment in the recording instruction area indicated by the recording command. Thus, the recording power condition is acquired (step 1207).

After the recording power adjustment is completed, the recording and reproduction condition list updating section 572 uses the acquired recording power condition to create a recording and reproduction condition list, and records the created recording and reproduction condition list in the drive information area. Thus, the drive information (recording and reproduction condition list) is updated (step 1208). Then, the recording control section 520 uses the obtained (i.e., read or acquired) recording power condition to record the data, which has been stored in the data buffer 550, in the recording instruction area indicated by the recording command (step 1209). The recording power adjustment processing performed in step 1207 and the recording processing performed in step 1209 are performed as described in the first example. In the example of FIG. 12, the recording and reproduction condition list is updated only using the acquired recording power condition. Alternatively or additionally, the recording and reproduction condition list can be updated using the recording and reproduction condition calculated in step 1206.

As described above, the recording power condition acquired by the recording power adjustment processing section 573 is used to update the drive information (recording and reproduction condition list). For example, the next time a recording command is received, the drive information (recording and reproduction condition) is read. In this manner, the probability that recording power adjustment is necessary can be lowered, and thus the wait time required for adjustment can be made shorter.

In the fifth example, the recording power adjustment processing and the recording processing are performed as described in the first example. The present invention is not limited to this, where the recording power adjustment processing and the recording processing can be performed as described in the second or the third example.

In the above description, the recording power condition is described as a specific example of a recording and reproduction condition. The recording and reproduction condition is not limited to the recording power condition, but can be, for example, a recording pulse condition.

In the fifth example, the area recording and reproduction condition in an area X includes temperature recording and reproduction conditions in a plurality of segmented temperature ranges. The present invention is not limited to such a system. An appropriate recording and reproduction condition corresponding to a segmented area and/or segmented temperature range can be obtained so long as the drive information area includes at least one of area recording and reproduction conditions or temperature recording and reproduction conditions.

EXAMPLE 6

In a sixth example according to the present invention, the information recording medium used in the fourth example is used to perform adjustment of a recording and reproduction condition. The information recording and reproduction apparatus used in the sixth example has substantially the same structure as that shown in FIG. 5 and will not be described here.

Figure 13:
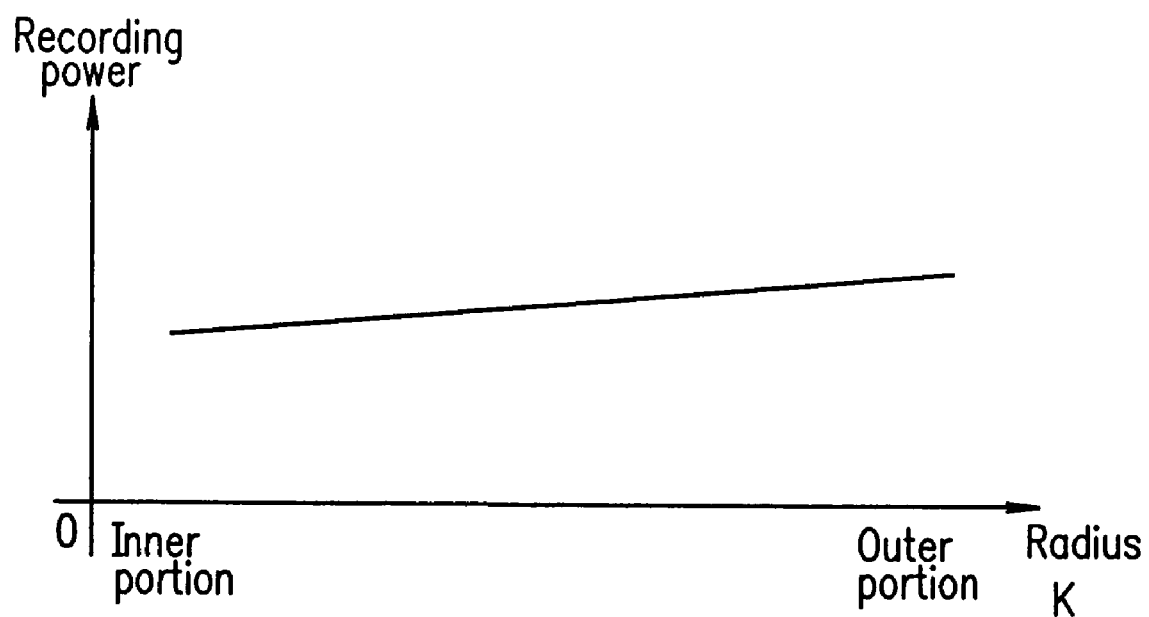
FIG. 13 is a graph illustrating a relationship between the radial position on an information recording medium and the recording power condition according to a sixth example of the present invention.
Figure 14:
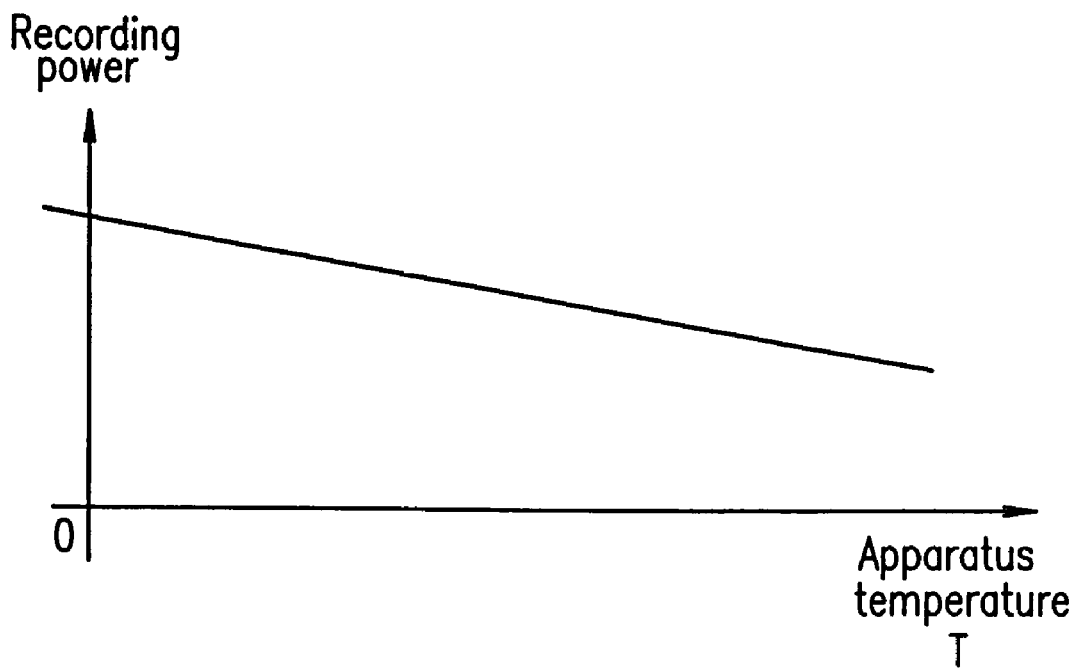
FIG. 14 is a graph illustrating a relationship between the apparatus temperature of an information recording and reproduction apparatus and the recording power condition according to the sixth example of the present invention.

In the sixth example, a recording power condition is described as a specific example of a recording and reproduction condition. FIG. 13 is a graph illustrating an example of a change in an optimum recording power of an optical disc from an inner portion to an outer portion in a radial direction thereof. In FIG. 13, the radius K is a positive numerical value. FIG. 14 is a graph illustrating an example of a change in an optimum recording power of an optical disc in accordance with an apparatus temperature of an optical disc apparatus. FIG. 14, the apparatus temperature T is an arbitrary numerical value. In most cases, the optimum recording power linearly changes with respect to the position (at which data is recorded or reproduced) of the optical disc in a radial direction thereof and the apparatus temperature as respectively shown in FIGS. 13 and 14.

Figure 15:
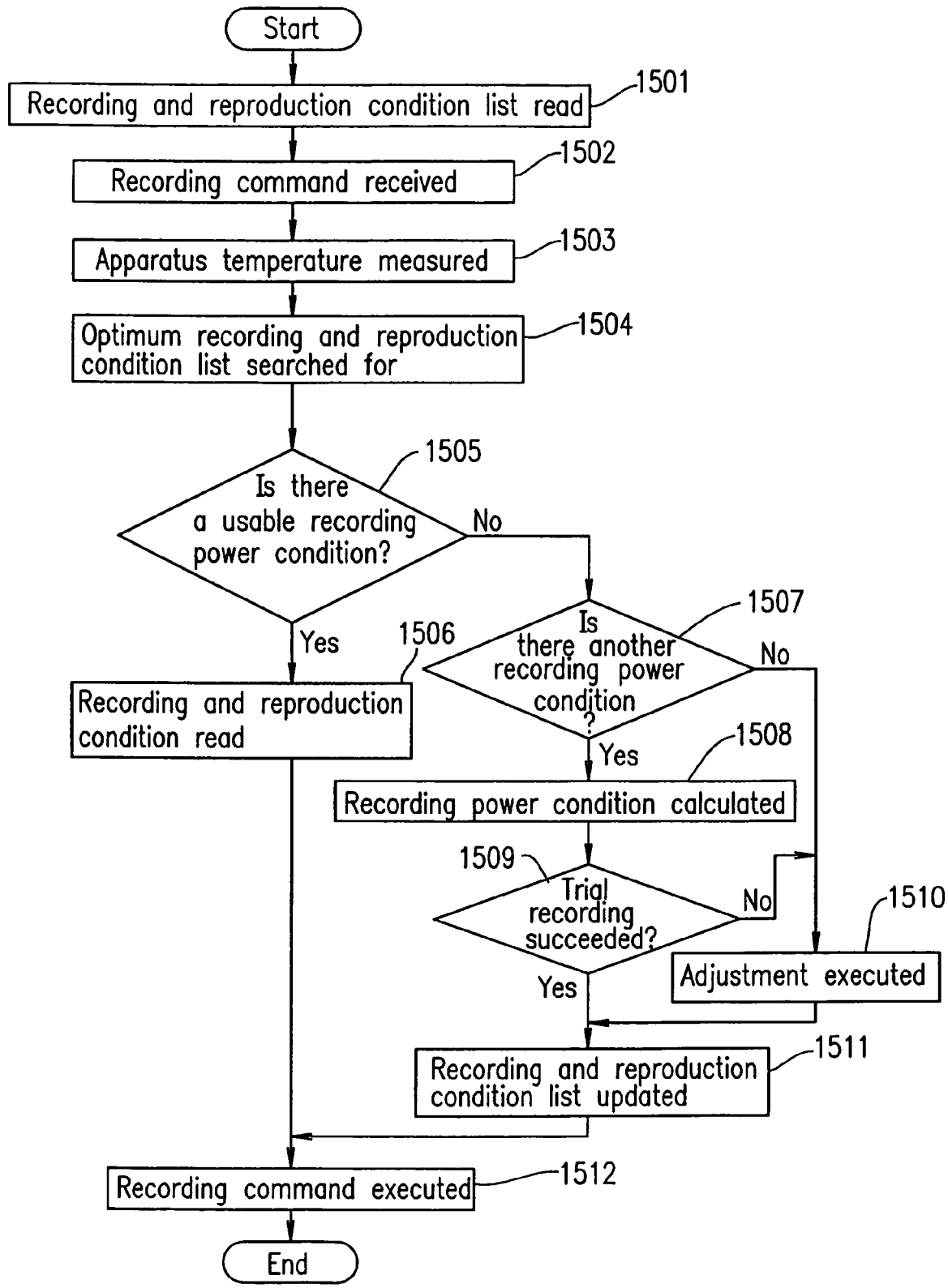
FIG. 15 is a flowchart illustrating a procedure of recording, reading of a recording and reproduction condition list, recording power adjustment, and updating of the recording and reproduction condition list according to the sixth example of the present invention.

FIG. 15 shows a procedure of recording, recording power adjustment, reading of a recording and reproduction condition list, and updating of the recording and reproduction condition list. The procedure is performed by the recording control section 520, the recording power adjustment processing section 573, the recording and reproduction condition list reading section 571, and the recording and reproduction condition list updating section 572 of the information recording and reproduction apparatus 500 (FIG. 5).

The processing in steps 1501 through 1505, 1506 and 1512 are the same as that in steps 1201 through 1205, 1206 and 1209 in FIG. 12, and will not be described here.

Herein, the recording power condition to be obtained will be referred to as a "first recording power condition", and a recording power condition which is used for calculating the first recording power condition when the first recording power condition is not recorded will be referred to as a "second recording power condition".

When it is determined that a first usable recording power is not recorded ("no" in step 1505), the recording power adjustment processing section 573 stores the data to be recorded in the data buffer 550 and temporarily stops recording processing. Then, the recording power adjustment processing section 573 determines whether or not at least one second usable recording power condition is included in another temperature recording and reproduction condition in the same area recording and reproduction condition or in a temperature recording and reproduction condition in another recording and reproduction condition (step 1507). When it is determined that there is the second recording power condition ("yes" in step 1507), the recording power adjustment processing section 573 uses at least one of the second usable recording power condition, and at least one of (i) an amount of change in the recording power with respect to the radial position on the optical disc, and (ii) an amount of change in the recording power with respect to the apparatus temperature of the optical disc apparatus to calculate a recording power condition corresponding to the apparatus temperature measured in step 1503 and a segmented area including a recording instruction area indicated by the recording command.

In the example of FIG. 15, the recording and reproduction condition list is updated using only the acquired recording power condition. Alternatively or additionally, the recording and reproduction condition list can be updated using the recording and reproduction condition calculated in step 1506.

It is assumed now, for example, that when a recording command including a content to be recorded in area 2 is received, it is found that the recording power condition for area 1, which is adjacent to area 2, is 10 mW as a result of searching for a second usable recording power condition from the recording and reproduction condition list. It is also assumed that the recording power condition has been confirmed to be different by 0.2 mW between two adjacent areas. In such a case, an optimum recording power condition for the recording instruction area indicated by the recording command is calculated to be 10.2 mW.

Next, the recording power adjustment processing section 573 uses the calculated recording power condition to execute a trial of recording and reproduction (step 1509). When the trial of recording and reproduction is successful ("yes" in step 1509), the recording and reproduction condition list updating section 572 uses the calculated recording power condition to update the drive information (recording and reproduction condition list). Then, the recording control section 520 uses the calculated recording power condition to record the data, which has been stored in the data buffer 550, in the recording instruction area indicated by the recording command (step 1512).

When the trial of recording and reproduction fails ("no" in step 1509), the recording power adjustment processing section 573 executes recording power adjustment in the recording instruction area indicated by the recording command so as to acquire a recording power condition (step 1510).

After recording power adjustment is completed, the recording and reproduction condition list updating section 572 uses the acquired recording power condition to create a recording and reproduction condition list, and records the created recording and reproduction condition list in the drive information area (step 1511). Thus, the drive information (recording and reproduction condition list) is updated (step 1511). Then, the recording control section 520 uses the acquired recording power condition to record the data, which has been stored in the data buffer 550, in the recording instruction area indicated by the recording command (step 1512). The recording power adjustment processing performed in step 1510 and the recording processing performed in step 1512 are performed as described in the first example.

As described above, when an optical disc apparatus has a certain apparatus temperature, even when a recording power condition corresponding to a segmented area, which includes the recording instruction area indicated by the recording command, is not included in the recording and reproduction condition list, an optimum recording power condition can be calculated so long as a recording power condition concerning another segmented area or another apparatus temperature is included in the recording and reproduction condition list. Using such a recording power condition and a rule which is already known (for example, a predetermined condition formula), the optimum recording power condition can be obtained. In this manner, the probability that recording power adjustment is necessary lowered, and thus the time period required for recording power adjustment is made shorter. As a result, the wait time required for adjustment can be made shorter.

In the sixth example, the recording power adjustment processing and the recording processing are performed as described in the first example. The present invention is not limited to this, where the recording power adjustment processing and the recording processing can be performed as described in the second or the third example.

In the above description, a recording power condition corresponding to another segmented area or another apparatus temperature is used to calculate an intended recording power condition to be acquired. Alternatively, the calculated recording power condition can be used to determine whether the recording power condition acquired by recording power adjustment is correct or not. Still alternatively, an intended recording power condition can be calculated using a recording power condition concerning at least one of another segmented area and an apparatus temperature of the optical disc apparatus.

In the above description, the recording power condition is described as a specific example of a recording and reproduction condition. The recording and reproduction condition is not limited to the recording power condition, where it can be, for example, a recording pulse condition.

EXAMPLE 7

In a seventh example according to the present invention, the information recording medium used in the sixth example is used to perform adjustment of a recording and reproduction condition. The information recording and reproduction apparatus used in the sixth example has substantially the same structure as that shown in FIG. 5 and will not be described here.

In the seventh example, a recording power condition is described as a specific example of a recording and reproduction condition.

The number of area recording and reproduction conditions 1102 and the number of temperature recording and reproduction conditions 1103 both shown in FIG. 11 are limited. It is assumed, for example, that one area recording and reproduction condition 1102 is provided for a respective one of the plurality of segmented areas obtained as a result of dividing an optical disc in a radial direction, and each area recording and reproduction condition 1102 is acquired at a central position in the radial direction of each respective segmented area. It is also assumed, for example, that one temperature recording and reproduction condition 1103 is provided for a respective one of a plurality of segmented temperature ranges in the range of 0° C. to 70° C. (so that each segmented temperature range covers the range of 10° C.), and the recording and reproduction condition acquired at, for example, 20° C. is set as a recording and reproduction condition for 20° C.

However, it is possible that the radial position on the segmented area or the apparatus temperature in which recording power adjustment is performed does not match the segmented area indicated by the area recording and reproduction condition 1102 or the apparatus temperature indicated by the temperature recording and reproduction condition 1103.

In the seventh example, a method will be described for calculating a value to be included in the area recording and reproduction condition 1102 and the temperature recording and reproduction condition 1103 in step 1511 of FIG. 15, regardless of the segmented area or the apparatus temperature in which recording power adjustment was performed. In this method, the characteristics of the recording power condition described in the sixth example are used.

The procedure of recording, recording power adjustment, reading of the recording and reproduction condition list, and updating of the recording and reproduction condition list is performed in a similar manner as that in FIG. 12, and will not be described here.

Figure 16:
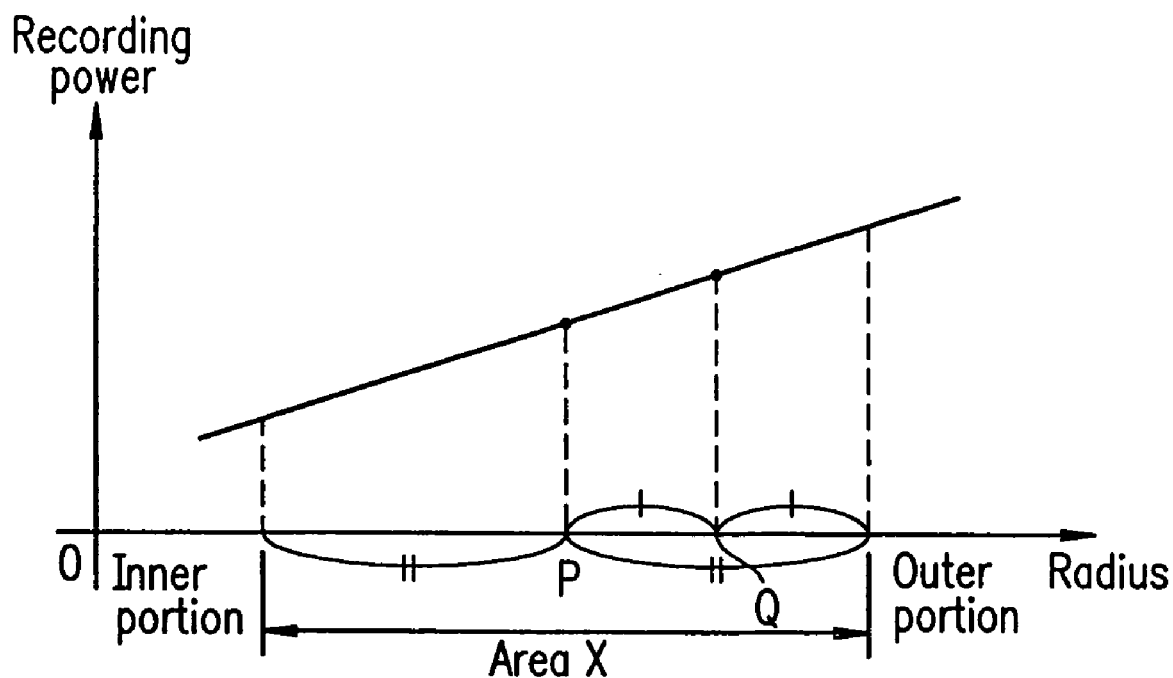
FIG. 16 is a graph illustrating a relationship between the radial position on an information recording medium and the recording power condition according to a seventh example of the present invention.

FIG. 16 is a graph illustrating an example of a change in an optimum recording power condition in area X of an optical disc. Area X is the X'th segmented area of a plurality of segmented areas obtained as a result of dividing the optical disc in a radial direction, where X is an integer of 0 or greater.

It is assumed, for example, that a radial position on an area in which recording power adjustment is performed in step 1207 of FIG. 12 is at a position ¾ of area X from the innermost periphery of area X (Q in FIG. 16). The recording and reproduction condition list updating section 572 uses the acquired recording power condition and the amount of change in the recording power with respect to the radial position on the optical disc to calculate a recording power condition to be included in the area recording and reproduction condition corresponding to area X. In this manner, the drive information (recording and reproduction condition list) is updated (step 1508). When, for example, the difference in the optimum recording power between the innermost periphery and the outermost periphery of the same area is 0.4 mW and the recording power acquired at position Q in FIG. 16 is 11 mW, an optimum recording power to be recorded as the recording and reproduction condition corresponding to area X is calculated as 10.9 mW.

Figure 17:
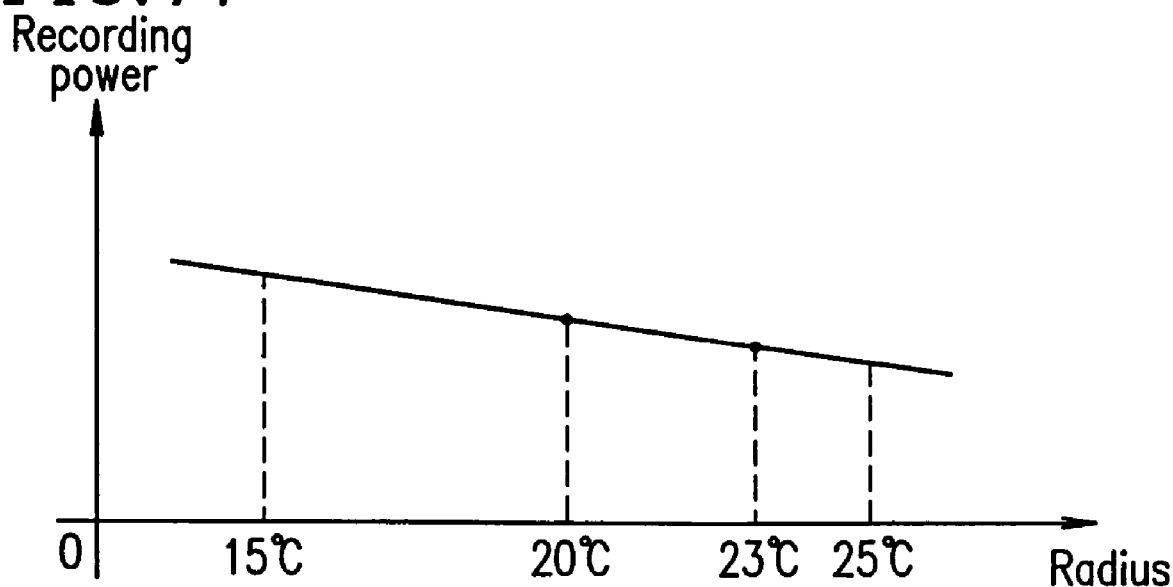
FIG. 17 is a graph illustrating a relationship between the apparatus temperature of an information recording and reproduction apparatus and the recording power condition according to the seventh example of the present invention.

FIG. 17 is a graph illustrating an example of the relationship between an apparatus temperature of an optical disc apparatus (alternatively, an ambient temperature of an optical disc mounted on the optical disc apparatus) and the optimum recording power condition. In FIG. 17, such a relationship in temperature of about 15° C. to about 25° C. is shown.

It is assumed, for example, that the apparatus temperature of the optical disc apparatus when recording power adjustment is performed in step 1207 is 23° C. The recording and reproduction condition list updating section 572 uses the acquired recording power condition and the amount of change in the recording power condition with respect to the apparatus temperature to calculate a recording power condition to be included in the temperature recording and reproduction condition 1103 corresponding to 20° C. Thus, the drive information (recording and reproduction condition list) is updated (steps 1508 and 1511). In the case where, for example, the optimum power condition decreases by 0.1 mW as the apparatus temperature rises 1° C. and the recording power condition at an apparatus temperature of 23° C. is 10 mW, an optimum recording power condition to be included in the temperature recording and reproduction condition corresponding to 20° C. is calculated as 10.3 mW.

As described above, even when the radial position of the segmented area or the apparatus temperature in which recording power adjustment was performed does not match the segmented area indicated by the area recording and reproduction condition or the apparatus temperature indicated by the temperature recording and reproduction condition, an appropriate recording power condition can be obtained using the recording power condition acquired by recording power adjustment and a rule which is already known (for example, a predetermined condition formula). As a result, a recording power condition which is optimum for the segmented area indicated by the area recording and reproduction condition and the apparatus temperature indicated by the temperature recording and reproduction condition can be calculated. This improves the efficiency of subsequent recording power adjustment.

Figure 18:
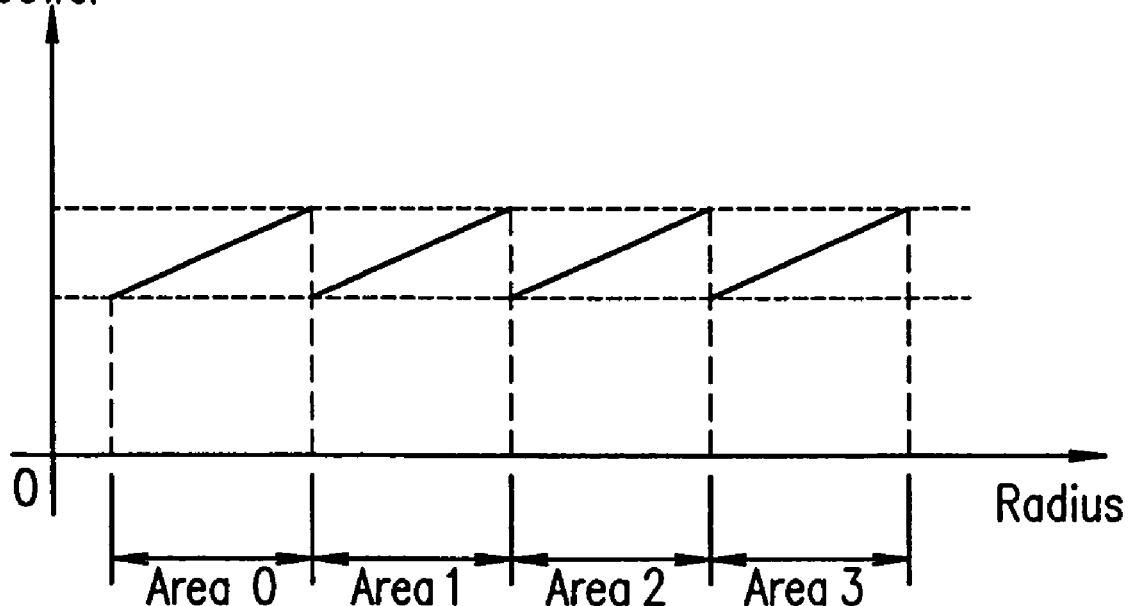
FIG. 18 is a graph illustrating a relationship between the radial position on an information recording medium and the recording power condition according to the seventh example of the present invention.
Figure 19:
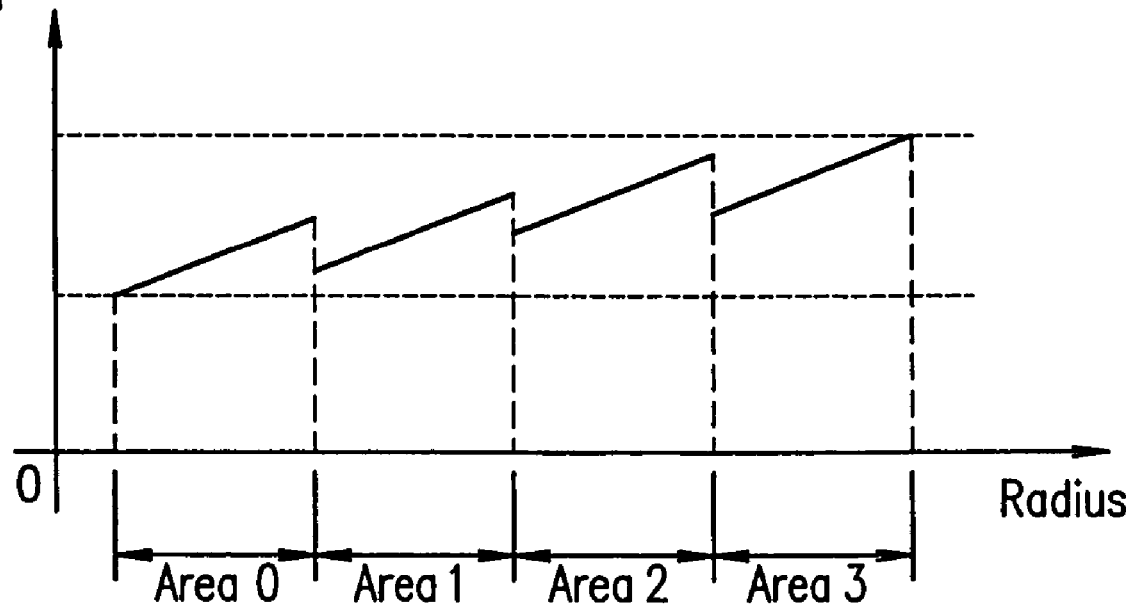
FIG. 19 is a graph illustrating a relationship between the radial position on an information recording medium and the recording power condition according to the seventh example of the present invention.

FIG. 18 is a graph illustrating an example of the relationship between the optimum recording power condition and the radial position on an optical disc of a ZCLV format. FIG. 19 is a graph illustrating an example of the relationship between the optimum recording power condition and the radial position on an optical disc of a ZCLV format. In FIGS. 18 and 19, the optimum recording power condition changes from the inner periphery to the outer periphery of each segmented area.

When the recording power condition changes as shown in FIG. 18 or 19, the optimum recording power PW in each area can be calculated from a formula, PW=aX+bn, where "a" is the amount of change (which is already known) in the recording power condition with respect to the radial position, "X" is the radial position, and "bn" is a fixed value which varies area-by-area. In the case where, for example, the condition formula with respect to the change in the recording power condition is different area by area, it is possible to first find a condition formula for calculating an optimum recording power condition for each area and then calculate an area recording and reproduction condition corresponding to the area which includes the radial position at which the recording power condition was acquired.

In the above description, the recording power condition is described as a specific example of a recording and reproduction condition. The recording and reproduction condition is not limited to the recording power condition, where it can be, for example, a recording pulse condition.

EXAMPLE 8

In the first through seventh examples, a recording power condition is mainly described as a specific example of a recording and reproduction condition. In an eighth example according to the present invention, a focus position condition will be described as a specific example of a recording and reproduction condition.

Figure 20:
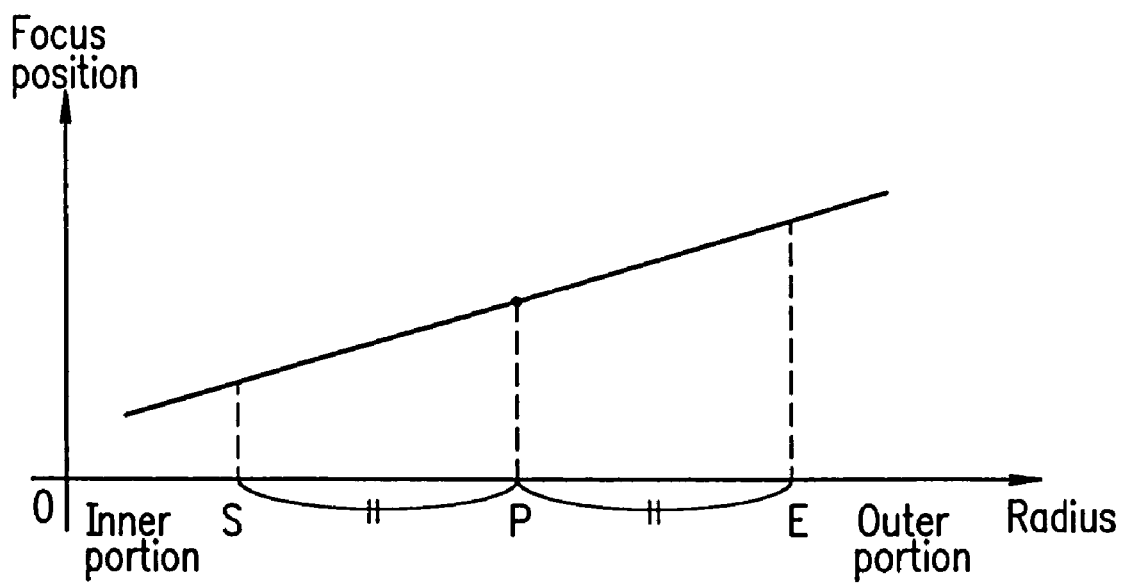
FIG. 20 is a graph illustrating a relationship between the radial position on an information recording medium and the focus position condition according to an eighth example of the present invention.
Figure 21:
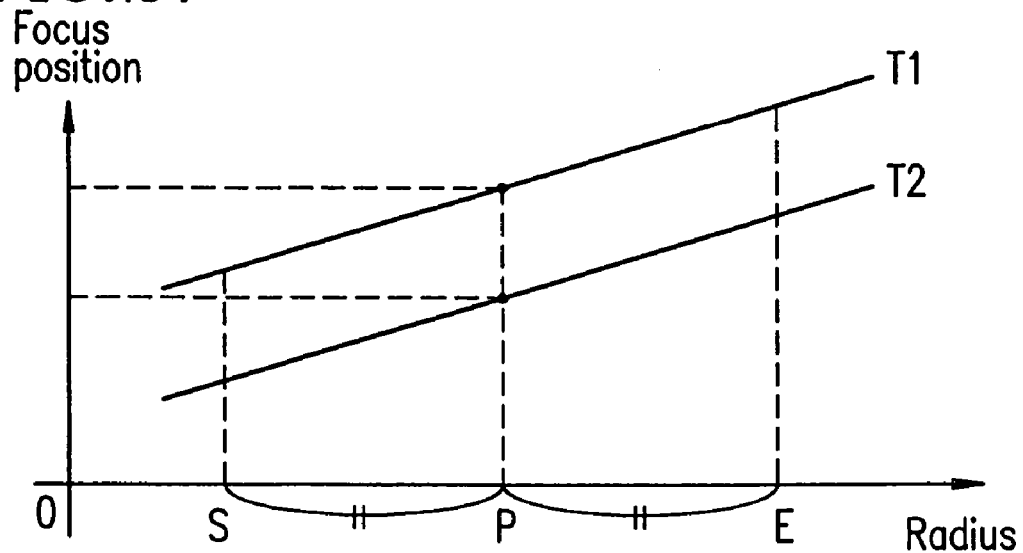
FIG. 21 is a graph illustrating a relationship between the radial position on an information recording medium and the apparatus temperature of an information recording and reproduction apparatus with the focus position condition according to the eighth example of the present invention.

FIG. 20 is a graph illustrating a change in an optimum focus position from an inner periphery to an outer periphery in a radial direction of an optical disc. FIG. 21 is a graph illustrating such a change obtained at two different apparatus temperatures T1 and T2, where T1 is higher than T2.

In most cases, the optimum focus position linearly changes with respect to the radial position on the optical disc as shown in FIGS. 20 and 21. When the apparatus temperature changes, the optimum focus position condition at the same radial position changes, but the amount of change with respect to the radial position does not change in most cases.

In the case of the focus position condition, it is preferable to obtain a focus position condition corresponding to the radial position on the optical disc and/or the apparatus temperature in order to perform focusing at an appropriate condition.

In FIGS. 20 and 21, the amount of change is constant from the inner periphery to the outer periphery in a radial direction of the optical disc regardless of the apparatus temperature. There are cases in which the amount of change (slope) varies in accordance with the apparatus temperature.

The change in the optimum focus position condition does not need to be continuous from the inner periphery to the outer periphery with respect to the radial position, as in the case of the recording power shown in FIGS. 18 and 19.

Hereinafter, search processing for obtaining a focus position condition as an example of a recording and reproduction condition will be described.

A focus position condition can be included in the area recording and reproduction condition 1102 (FIG. 11). A plurality of area recording and reproduction conditions 1102 can each include a plurality of temperature recording and reproduction conditions 1103. In the case where a focus position condition in a radial direction of the optical disc can be calculated from a focus position condition at an inner periphery and a focus position condition at an outer periphery of the optical disc, the number of area recording and reproduction conditions (K) can be two.

Figure 22:
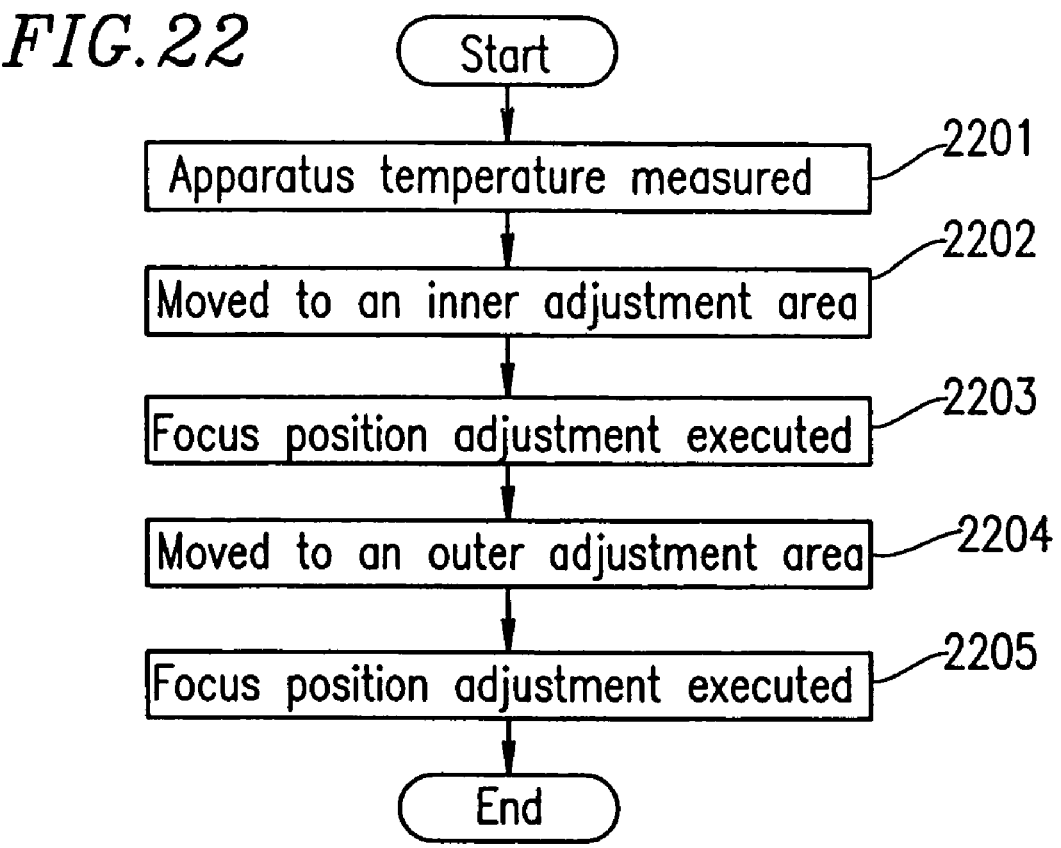
FIG. 22 is a flowchart illustrating a procedure of focus position adjustment when an information recording and reproduction apparatus is activated according to the eighth example of the present invention.

FIG. 22 shows a procedure of focus position condition adjustment. This procedure is performed, for example, when the information recording and reproduction apparatus is activated. The adjustment processing is executed by the temperature measuring section 560, the search control processing section 590 and the focus position adjustment processing section 574 of the optical disc apparatus 500 (FIG. 5).

First, the temperature measuring section 560 measures an apparatus temperature (step 2201). Next, the search control processing section 590 moves the optical head to an adjustment area in an inner portion of the optical disc (step 2202). Then, the focus position adjustment processing section 574 performs focus position adjustment so as to acquire a focus position condition in the inner portion (step 2203). The search control processing section 590 moves the optical head to an adjustment area in an outer portion of the optical disc (step 2204). Then, the focus position adjustment processing section 574 performs focus position adjustment so as to acquire a focus position condition in the outer portion (step 2205). The focus position conditions at the inner portion and the outer portion are used to perform the following search processing.

In the eighth example, focus position adjustment is performed in an adjustment area in the inner portion and an adjustment area in the outer portion. The present invention is not limited to such a system. For example, focus position adjustment can be performed at an arbitrary radial position in a data area and then another position in another data area which is a certain distance away from the arbitrary radial position in the radial direction.

Figure 23:
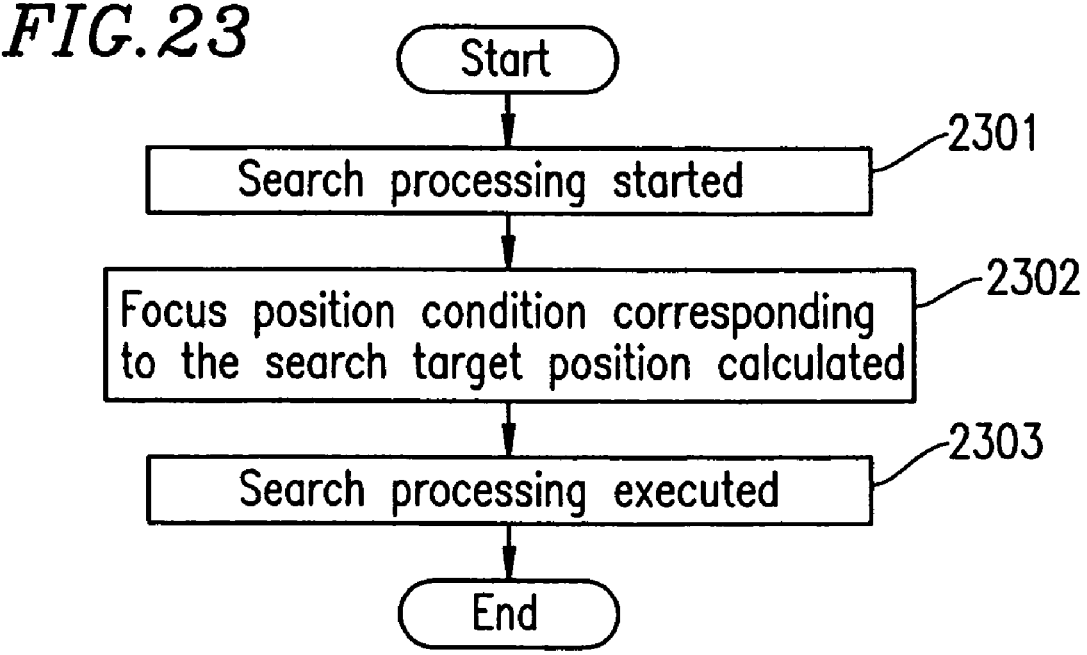
FIG. 23 is a flowchart illustrating a procedure of searching and focus position adjustment according to the eighth example of the present invention.

FIG. 23 shows a procedure of a search. The search processing is performed when, for example, a recording command or a reproduction command is received and the optical head needs to be moved to a recording and reproduction instruction indicated by the recording or reproduction command. The search processing is performed by the temperature measuring section 560, the search control processing section 590 and the focus position adjustment processing section 574 of the optical disc apparatus 500 (FIG. 5).

The search processing section 590, which has received an instruction to perform search processing (a so-called seek operation) through the instruction processing section 510, confirms a radial position as a target of the search (search target radial position)(step 2301). Next, the focus position adjustment processing section 574 uses the two focus position conditions acquired beforehand to calculate a focus position condition of the search target radial position (step 2302). In the case where, for example, focus position conditions have already been acquired at points S and E in FIG. 20 and point P between points S and E is the search target radial position, a focus position condition at point P is calculated by taking {(focus position condition at point S)+(focus position condition at point E)}÷2. Then, the calculated focus position condition is set, and the optical head is moved to the search target radial position (step 2303).

As a result, it becomes possible to obtain an optimum focus position condition. The optimum focus position condition can be used for search processing without actually acquiring the focus position condition of the search target radial position.

Figure 24:
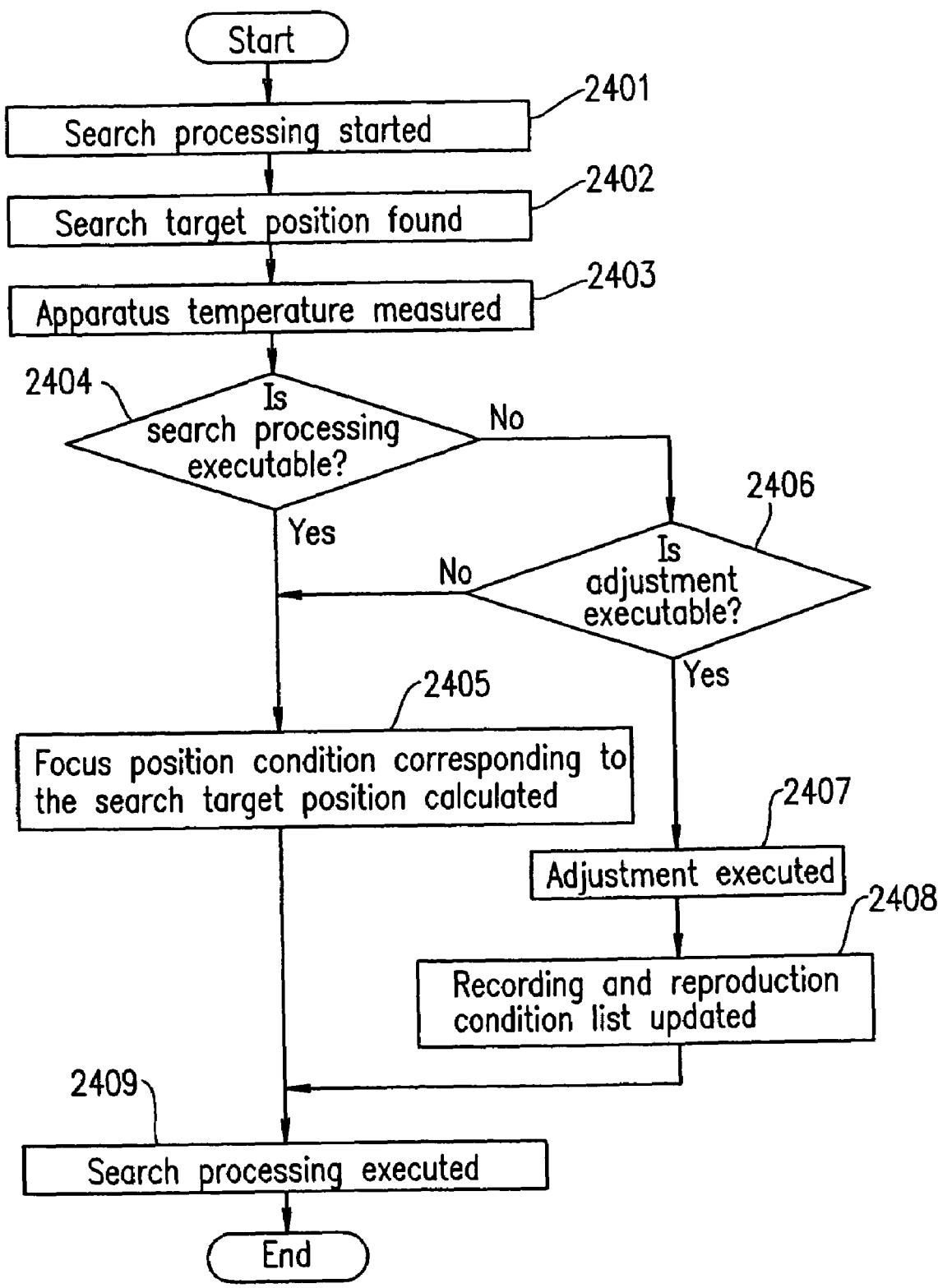
FIG. 24 is a flowchart illustrating a procedure of searching and focus position adjustment according to the eighth example of the present invention.

FIG. 24 shows a procedure of a search performed when the apparatus temperature changes. Namely, the procedure shown in FIG. 24 is provided in consideration of the apparatus temperature as compared to the procedure shown in FIG. 23. The search processing shown in FIG. 24 causes the optical head to move to a recording and reproduction instruction area indicated by a received recording or reproduction command. The adjustment processing is performed by the search control section 590, the temperature measuring section 560, the recording and reproduction condition list updating section 572 and the focus position adjustment processing section 574 of the optical disc apparatus 500 (FIG. 5).

The search control processing section 590, which has received an instruction to perform search processing (a so-called seek operation) through the instruction processing section 510 (step 2401), obtains a search target radial position (step 2402). Next, the temperature measuring section 560 measures an apparatus temperature (step 2403). Then, the focus position adjustment processing section 574 determines whether or not search processing is possible (step 2404). The determination can be performed based on, for example, whether a focus position condition appropriate to the measured apparatus temperature is recorded or not.

When the focus position condition corresponding to the measured apparatus temperature is recorded ("yes" in step 2404), the focus position adjustment processing section 574 calculates a focus position condition corresponding to the search target radial position (step 2405), and then sets the focus position condition and executes the search processing (step 2409).

When the focus position condition corresponding to the measured apparatus temperature is not recorded ("no" in step 2404) due to a change in the apparatus temperature as a result of long-time continuous use, the focus position adjustment processing section 574 determines whether or not focus position adjustment is possible (step 2406). This determination can be performed based on, for example, whether or not there is an adjustment area in the search target radial position or in the vicinity thereof.

When focus position adjustment is impossible ("no" in step 2406), the focus position adjustment processing section 574, for example, re-uses the apparatus temperature used for the previous search processing to calculate a focus position condition corresponding to the apparatus temperature (step 2405). Then, the focus position adjustment processing section 574 uses the calculated focus position condition to execute the search processing (step 2409).

When focus position adjustment is possible ("yes" in step 2406), the focus position adjustment processing section 574 execute adjustment so as to acquire a focus position condition (step 2407).

The recording and reproduction condition list updating section 572 updates the recording and reproduction condition list based on the acquired focus position condition and the apparatus temperature.

In the case where, for example, T1 (FIG. 21) is the apparatus temperature obtained in the previous search processing and T2 is the apparatus temperature obtained in the present search processing, the focus position condition at point S corresponding to T2 is calculated as (focus position condition at point S with T1)+{(focus position condition at point P with T2)−(focus position condition at point P with T1)}. The focus position condition at point E corresponding to T2 is calculated as (focus position condition at point E with T1)+{(focus position condition at point P with T2)−(focus position condition at point P with T1)}. Using the thus calculated focus position condition, the recording and reproduction condition list is updated. Then, the obtained focus position condition is used to perform the search processing (step 2409).

In the eighth example, a radial position is used as the position of the target of the search. The present invention is not limited to this. For example, it is possible to perform adjustment at a radial position on the optical head when a command is received and calculate a focus position condition at the position of the target of the search using the obtained focus position conditions in the inner and outer portions.

Figure 25:
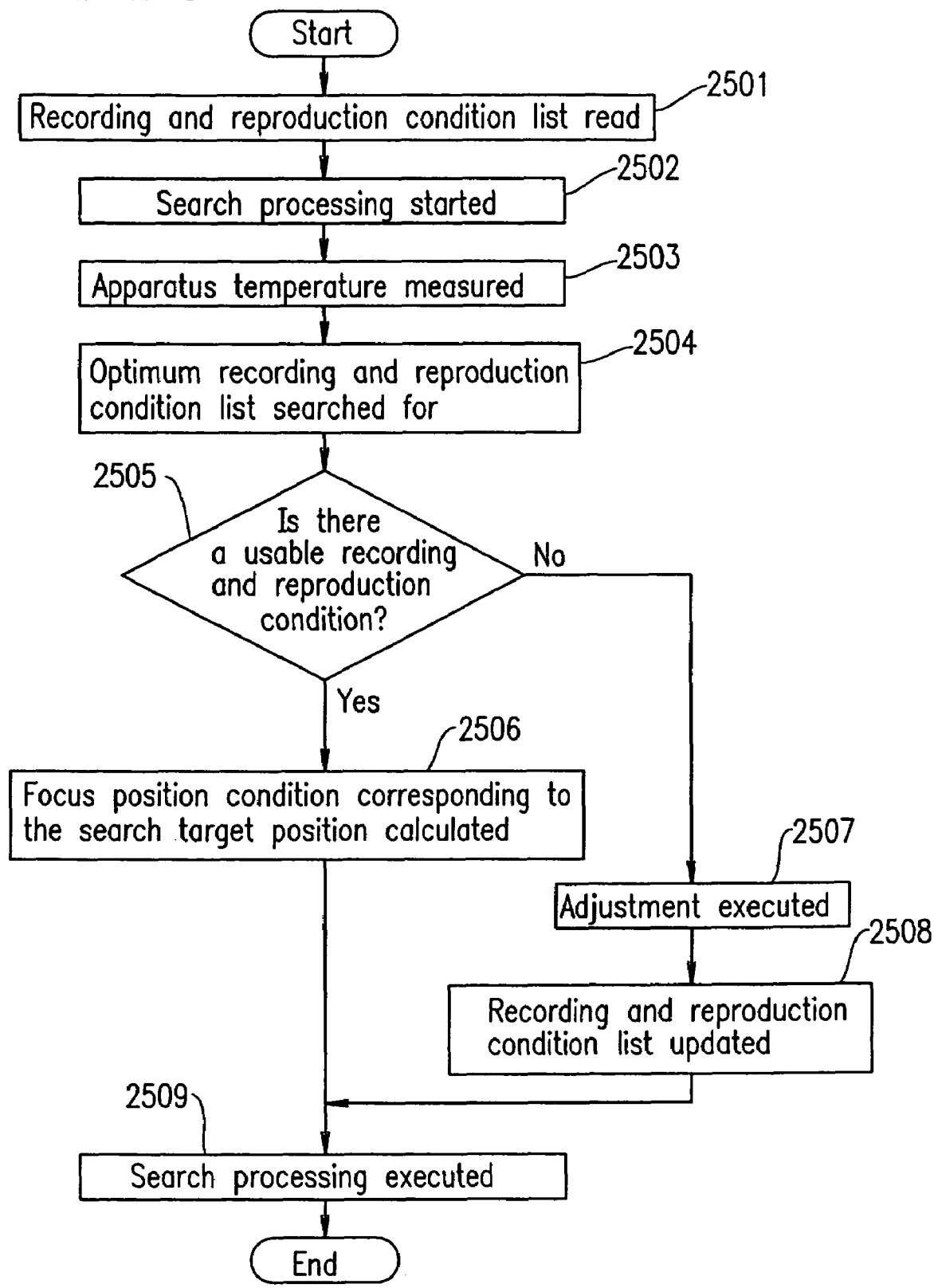
FIG. 25 is a flowchart illustrating a procedure of searching, reading of a recording and reproduction condition list, focus position adjustment, and updating of the recording and reproduction condition list according to the eighth example of the present invention.

FIG. 25 shows a procedure of a search, reading a recording and reproduction condition list, performing focus position adjustment processing, and updating the recording and reproduction condition list. This procedure is performed by the search control section 590, the focus position adjustment processing section 574, the recording and reproduction condition list reading section 571 and the recording and reproduction condition list updating section 572 of the optical disc apparatus 500 (FIG. 5).

After the optical disc apparatus 500 is activated or after an optical disc is mounted on the optical disc apparatus 500, the recording and reproduction condition list reading section 571 reads a recording and reproduction condition list from the drive information area and stores the recording and reproduction condition in the recording and reproduction condition list storage buffer 540 (step 2501). Then, the search processing section 590, which has received an instruction to perform search processing through the instruction processing section 510 (step 2502), measures the apparatus temperature of the optical disc apparatus (step 2503). Then, the search processing section 590 searches the recording and reproduction condition list for a focus position condition corresponding to the present apparatus temperature (step 2504). The search operation includes, for example, searching for a recording and reproduction condition having a manufacturer identifier and a drive identifier which matches those of the optical disc apparatus.

When there is a recording and reproduction condition having a manufacturer identifier and a drive identifier which matches those of the optical disc apparatus, the focus position adjustment processing section 574 can search for a temperature recording and reproduction condition area corresponding to the apparatus temperature included in the recording and reproduction condition and is measured in step 2503 and determine whether or not an effective focus position condition corresponding to the apparatus temperature is recorded. The determination can be made, for example, as follows. In the case where the focus position condition is represented with two hexadecimal numerals, when the focus position condition is represented by a value of 00h, which cannot be the focus position condition, it is determined that no focus position condition is recorded; and when the focus position condition is represented by a value other than 00h, it is determined that a focus position condition is recorded. The method for determination is not limited to this method.

When, as a result of the search in step 2504, it is determined that a usable focus position condition is included in the recording and reproduction condition list ("yes" in step 2505), the focus position adjustment processing section 574 uses the usable focus position condition to calculate a focus position condition at the search target radial position (step 2506).

When, as a result of the search in step 2504, it is determined that no usable focus position condition is included in the recording and reproduction condition list ("no" in step 2505), the focus position adjustment processing section 574 executes focus position adjustment at the search target radial position or the vicinity thereof (step 2507). Then, the recording and reproduction condition list updating section 572 uses the calculated focus position condition to create a recording and reproduction condition list, and records the created recording and reproduction condition list in the drive information area. Thus, the drive information (recording and reproduction condition list) is updated (step 2508). The method of updating is described above. Then, the search control section 590 uses the thus obtained focus position condition to move the optical head to the search target radial position (step 2509).

As described above, the focus position condition acquired by the focus position adjustment processing section 574 is used to update the drive information (recording and reproduction condition list). For example, the next time a search command is received, the drive information (recording and reproduction condition) is read. In this manner, the probability that focus position adjustment is necessary can be lowered, and thus the wait time required for focus position adjustment can be made shorter.

The recording power condition described in the first through seventh examples is used for recording data, and is usable for a rewritable disc, a write once disc, or the like. The focus position condition of the eighth example is used both for recording and reproducing data, and is usable for a read-only disc as well as a rewritable disc and a write once disc.

According to one aspect of the present invention, recording adjustment is performed in a recording instruction area indicated by a recording command after data to be recorded is stored in a data buffer and the recording processing is temporarily stopped. Then, the acquired recording and reproduction condition is used to perform recording processing. In this manner, a recording and reproduction condition appropriate to the recording instruction area can be acquired, and thus the probability of failure of recording is reduced. By thus obtaining a recording and reproduction condition corresponding to the recording instruction area of the information recording medium, appropriate recording can be performed.

According to another aspect of the present invention, data to be recorded is stored in a data buffer and recording is temporarily stopped. Then, an unused spare area is searched for in the vicinity of the recording instruction area indicated by the recording command. When there is an unused spare area, adjustment of a recording and reproduction condition is performed. When there is no such unused spare area, adjustment of a recording and reproduction condition is performed in the recording instruction area indicated by the recording command. Then, the acquired recording and reproduction condition is used to perform recording. In this manner, a recording power condition appropriate to the recording instruction area in which data is to be recorded can be obtained, reducing the undesirable possibility of failure of recording. In addition, the recording instruction area can be prevented from being deteriorated, thus preventing a lowering of the number of times data can be recorded in one recording instruction area.

According to still another aspect of the present invention, an information recording medium having an adjustment-only area in the vicinity of a recording instruction area is used. Data to be recorded is stored in a data buffer and recording processing is temporarily stopped. Then, adjustment of a recording and reproduction condition is performed in an adjustment-only area in the vicinity of an a recording instruction area indicated by the recording command. After that, the acquired recording and reproduction condition is used to perform recording. In this manner, a recording and reproduction condition can be acquired appropriate to the recording instruction area indicated by the recording command without any need to specifically prepare an area for adjustment of a recording and reproduction condition. Thus, the probability of failure of recording is reduced. In addition, the recording instruction area can be prevented from being deteriorated, thus preventing a lowering of the number of times data can be recorded in one recording instruction area.

According to still another aspect of the present invention, an information recording medium having version information which indicates history information concerning firmware for an information recording and reproduction apparatus is used. Thus, it becomes possible to determine whether the recording and reproduction condition is re-usable or not when updating the recording and reproduction condition after alteration of the firmware. As a consequence, the wait time required for a subsequent adjustment of the recording and reproduction condition can be made shorter.

According to still another aspect of the present invention, the information recording medium having a drive information area for recording a plurality of area recording and reproduction conditions respectively corresponding to a plurality segmented areas and a plurality of temperature recording and reproduction conditions corresponding to a plurality of apparatus temperature ranges of an information recording and reproduction apparatus is used. When receiving a recording command, the information recording and reproduction apparatus performs search processing in order to determine whether or not an optimum recording and reproduction condition is included in the recording and reproduction conditions. When the optimum recording and reproduction condition is not recorded in the drive information area, adjustment of a recording and reproduction condition is performed so as to acquire a recording and reproduction condition. The acquired recording and reproduction condition is used to perform recording. The recording and reproduction condition list is updated with the acquired recording and reproduction condition. When the optimum recording and reproduction condition is recorded in the drive information area, the optimum recording and reproduction condition is read so as to perform recording. In this manner, the probability that adjustment of a recording and reproduction condition is necessary is reduced, and thus the wait time required for adjustment can be reduced.

According to still another aspect of the present invention, a recording and reproduction condition corresponding to a segmented area which is different from the segmented area including the recording instruction area to which data is to be recorded, or corresponding to an apparatus temperature which is different from the present apparatus temperature, is used to calculate a recording and reproduction condition corresponding to the recording instruction area to which data is to be recorded and the present apparatus temperature. In this manner, even when the recording and reproduction condition corresponding to the recording instruction area to which data is to be recorded and the present apparatus temperature is not recorded in the drive information area, an optimum recording and reproduction condition can be calculated, and thus the wait time required for adjustment can be made shorter.

According to still another aspect of the present invention, when the radial position at which a recording and reproduction condition needs to be obtained does not match the radial position indicated by the area recording and reproduction condition, or the apparatus temperature at which a recording and reproduction condition needs to be obtained does not match the apparatus temperature indicated by the temperature recording and reproduction condition, a recorded recording and reproduction condition is used in a condition formula, which is already known, so as to calculate a recording and reproduction condition corresponding to a desired radial position area or a recording and reproduction condition corresponding to a desired apparatus temperature. In this manner, adjustment of a recording and reproduction condition can be efficiently performed.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An information recording and reproduction method for an information recording medium including a data area divided into a plurality of segmented areas in a radial direction of the information recording medium, the method comprising the steps of:
   (a) indicating a segmented area which is a target of recording and reproduction among the plurality of segmented areas;
   (b) obtaining a recording and reproduction condition corresponding to the indicated segmented area;
   (c) performing recording and reproduction based on the obtained recording and reproduction condition; and (d) recording the recording and reproduction condition on at least one of a lead-in area and a lead-out area of the information recording medium, wherein the step (b) includes the step of acquiring the recording and reproduction condition by adjustment processing and wherein the information recording medium further includes a drive information area having drive information including the recording and reproduction condition recorded therein, and the step (b) includes the step of reading the recording and reproduction condition recorded in the drive information area.

2. An information recording and reproduction method according to claim 1, wherein the recording and reproduction condition defines an operation condition when an information recording and reproduction apparatus which can have the information recording medium mounted thereon performs data recording and reproduction.

3. An information recording and reproduction method according to claim 1, wherein:

the drive information includes version information which indicates a condition at which the recording and reproduction condition is acquired, and the method further includes the step of:

(e) determining whether the recording and reproduction condition is re-usable or needs to be updated, based on the version information.

4. An information recording and reproduction method according to claim 3, wherein the version information includes history information concerning firmware for an information recording and reproduction apparatus.

5. An information recording and reproduction method according to claim 1, wherein the step (b) includes the step of using an adjustment area included in each of the plurality of segmented areas for the adjustment processing.

6. An information recording and reproduction method according to claim 1, wherein the step (b) includes the step of using an adjustment-only area included in the data area, which is only used for the adjustment processing.

7. An information recording and reproduction method according to claim 1, wherein the plurality of segmented areas each correspond to at least one zone in accordance with one of a ZCLV format and a ZCAV format.

8. An information recording and reproduction method according to claim 1, wherein at least one of the plurality of segmented areas includes at least one recording and reproduction instruction area.

9. An information recording and reproduction method for an information recording medium including a data area divided into a plurality of segmented areas in a radial direction of the information recording medium, the method comprising the steps of:

(a) indicating a segmented area which is a target of recording and reproduction among the plurality of segmented areas;

(b) obtaining a recording and reproduction condition corresponding to the indicated segmented area;

(c) performing recording and reproduction based on the obtained recording and reproduction condition; and (d) recording the recording and reproduction condition on at least one of a lead-in area and a lead-out area of the information recording medium, wherein the step (b) includes the step of acquiring the recording and reproduction condition by adjustment processing, and wherein the data area includes at least one user area and at least one spare area including at least one substitute area usable in place of a defective area in the user area when the user area includes the defective area, and the step (b) includes the step of using an unused substitute area among the at least one substitute area in the spare area for the adjustment processing.

10. An information recording and reproduction apparatus for an information recording medium including a data area divided into a plurality of segmented areas in a radial direction of the information recording medium, the apparatus comprising:

an adjustment information processing section for obtaining a recording and reproduction condition corresponding to a segmented area which is a target of recording and reproduction among the plurality of segmented areas; and a recording and reproduction control section for performing recording and reproduction based on the obtained recording and reproduction condition, wherein the adjustment information processing section acquires the recording and reproduction condition by adjustment processing, and the adjustment information processing section records the recording and reproduction condition on at least one of a lead-in area and a lead-out area of the information recording medium and wherein the information recording medium further includes a drive information area having drive information including the recording and reproduction condition recorded therein, and the adjustment information processing section reads the recording and reproduction condition recorded in the drive information area.

11. An information recording and reproduction apparatus according to claim 10, wherein the recording and reproduction condition defines an operation condition when an information recording and reproduction apparatus performs data recording and reproduction.

12. An information recording and reproduction apparatus according to claim 10, wherein:

the drive information includes version information which indicates a condition at which the recording and reproduction condition is acquired, and the adjustment information processing section determines whether the recording and reproduction condition is re-usable or needs to be updated, based on the version information.

13. An information recording and reproduction apparatus according to claim 12, wherein the version information includes history information concerning firmware for the information recording and reproduction apparatus.

14. An information recording and reproduction apparatus according to claim 10, wherein the adjustment information processing section acquires the recording and reproduction condition from an adjustment area included in each of the plurality of segmented areas by the adjustment processing.

15. An information recording and reproduction apparatus according to claim 10, wherein the adjustment information processing section acquires the recording and reproduction condition from an adjustment-only area included in the data area, which is only used for acquiring the recording and reproduction condition.

16. An information recording and reproduction apparatus according to claim 10, wherein the plurality of segmented areas each correspond to at least one zone in accordance with one of a ZCLV format and a ZCAV format.

17. An information recording and reproduction apparatus according to claim 10, wherein at least one of the plurality of segmented areas includes at least one recording and reproduction instruction area.

18. An information recording and reproduction apparatus for an information recording medium including a data area divided into a plurality of segmented areas in a radial direction of the information recording medium, the apparatus comprising:

an adjustment information processing section for obtaining a recording and reproduction condition corresponding to a segmented area which is a target of recording and reproduction among the plurality of segmented areas; and a recording and reproduction control section for performing recording and reproduction based on the obtained recording and reproduction condition, wherein the adjustment information processing section acquires the recording and reproduction condition by adjustment processing, and the adjustment information processing section records the recording and reproduction condition on at least one of a lead-in area and a lead-out area of the information recording medium wherein the data area includes at least one user area and at least one spare area including at least one substitute area usable in place of a defective area in the user area when the user area includes the defective area, and the adjustment information processing section acquires the recording and reproduction condition from an unused substitute area among the at least one substitute area in the spare area by the adjustment processing.

* * * * *